United States Patent [19]
Watanabe et al.

[11] Patent Number: 6,148,631
[45] Date of Patent: Nov. 21, 2000

[54] SILENCER AND AIR CONDITIONER

[75] Inventors: Masahito Watanabe; Yoshimasa Katsumi; Yasuki Fujii; Shotaro Ito; Masanori Tanigawa, all of Kanagawa; Yasuhiro Asaida, Kyoto, all of Japan

[73] Assignees: Matsushita Electric Industrial Co., Ltd.; Matsushita Seiko Co., Ltd., both of Osaka, Japan

[21] Appl. No.: 09/311,343

[22] Filed: May 13, 1999

[30] Foreign Application Priority Data

May 14, 1998 [JP] Japan ................................ 10-131681

[51] Int. Cl.⁷ .................................................. F25D 19/00
[52] U.S. Cl. .............................................. 62/296; 181/196
[58] Field of Search ............................. 62/296, 511, 527; 181/196

[56] References Cited

U.S. PATENT DOCUMENTS

| | | | |
|---|---|---|---|
| 1,014,841 | 1/1912 | Morse | 181/196 |
| 3,815,379 | 6/1974 | Scherer et al. | 62/296 |
| 4,381,651 | 5/1983 | Kubo et al. | 62/296 |
| 4,408,467 | 10/1983 | Murnane et al. | 62/296 |
| 4,955,210 | 9/1990 | Hansen | 62/511 |

FOREIGN PATENT DOCUMENTS

| | | | |
|---|---|---|---|
| 402017368 | 1/1990 | Japan | 62/296 |
| 5-113272 | 5/1993 | Japan . | |
| 5-118709 | 5/1993 | Japan . | |
| 5-322379 | 12/1993 | Japan . | |
| 406026738 | 2/1994 | Japan | 62/296 |
| 6-14685 | 2/1994 | Japan . | |
| 8-313113 | 11/1996 | Japan . | |
| 9-133434 | 5/1997 | Japan . | |
| 9-250844 | 9/1997 | Japan . | |
| 9-250845 | 9/1997 | Japan . | |

*Primary Examiner*—William E. Tapolcai
*Attorney, Agent, or Firm*—Wenderoth, Lind & Ponack, L.L.P.

[57] ABSTRACT

A plurality of honeycomb pipes bundling a plurality of fine tubes are inserted and fixed at desired positions in a refrigerant piping at proper intervals to form a silencer, and noise is reduced by straightening and homogenizing the disturbance of refrigerant and attenuating transmission of pressure pulsations.

36 Claims, 18 Drawing Sheets

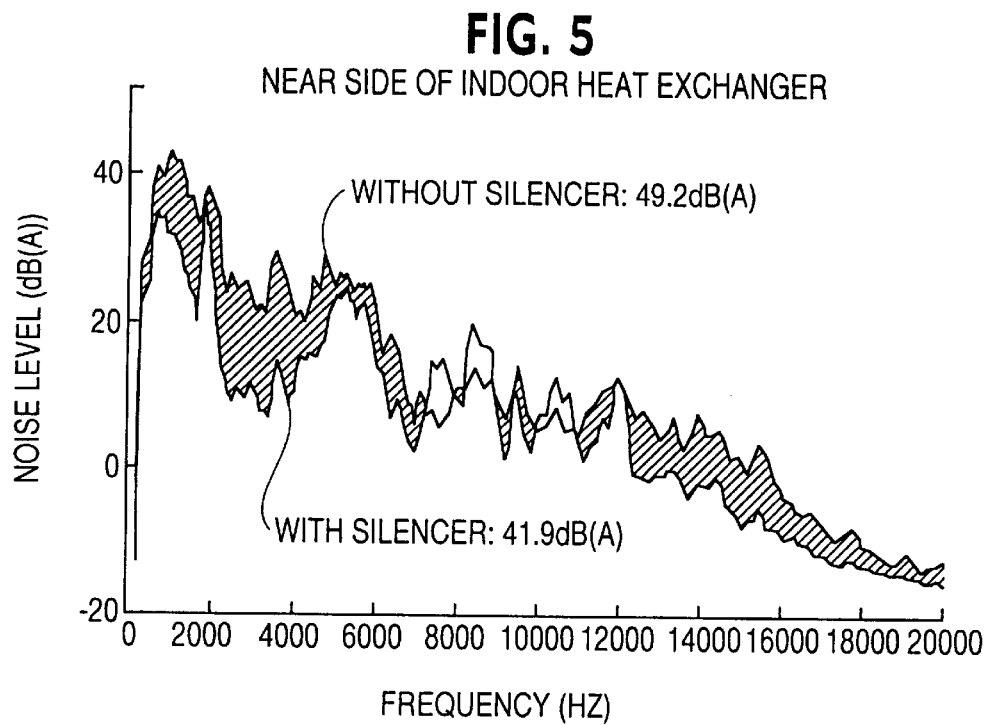
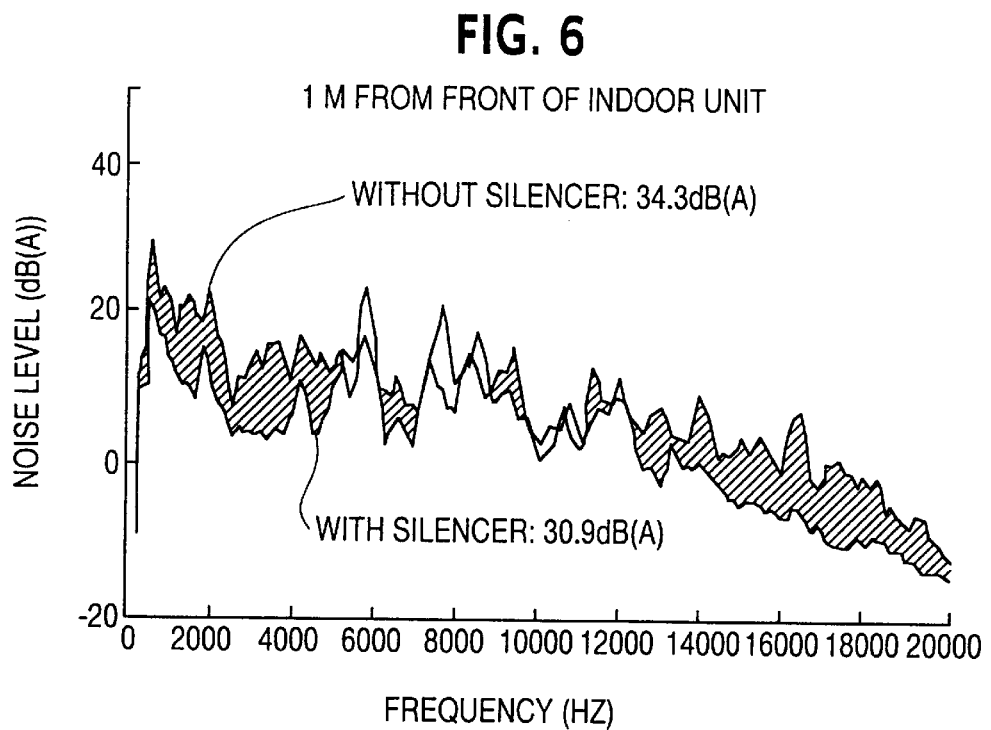

NEAR SIDE OF INDOOR HEAT EXCHANGER

1 M FROM FRONT OF INDOOR UNIT

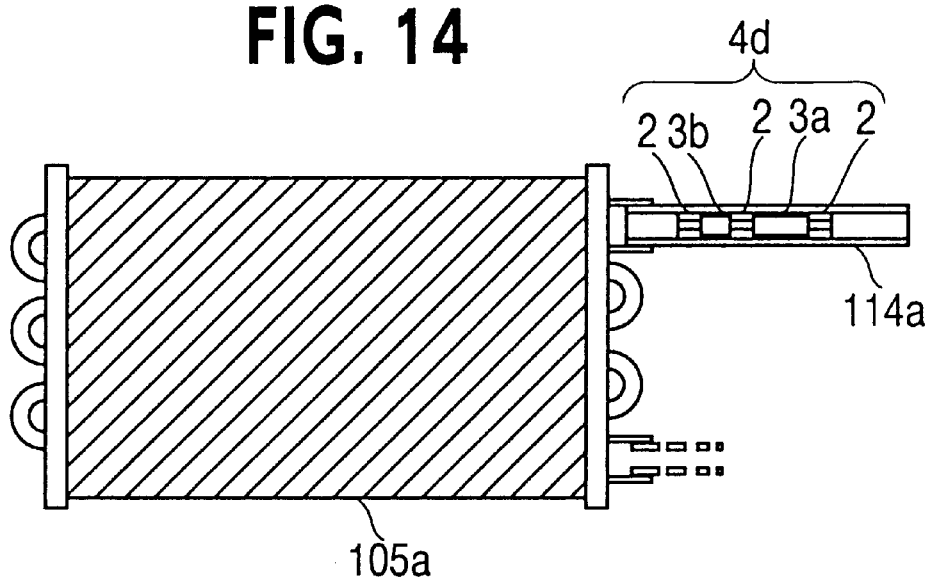
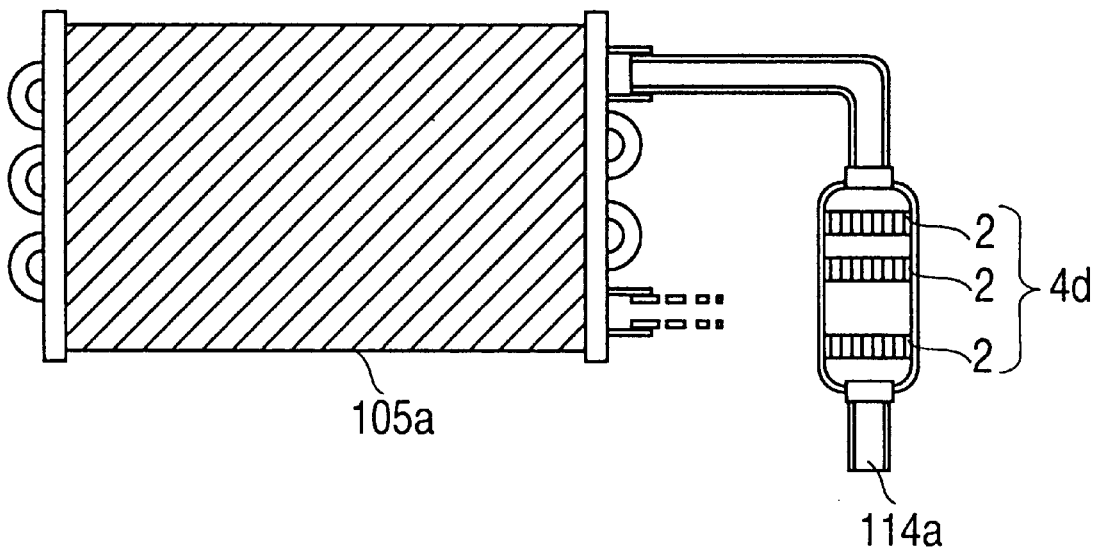

SILENCER AND AIR CONDITIONER

FIELD OF THE INVENTION

The present invention relates to a silencer for reducing the noise caused by state changes of refrigerant flowing in a refrigeration cycle, and an air conditioner using such silencer.

BACKGROUND OF THE INVENTION

A conventional air conditioner is described below while referring to FIG. 24 and FIG. 25.

As shown in the drawings, a refrigeration cycle is a closed circuit comprising a compressor 101, a refrigerant discharge piping 112, a four-way valve 102, an outdoor heat exchanger 103, pressure reducing means 104a, 104b (expansion valve or capillary tube), and indoor heat exchangers 105a, 105b, all being coupled together by means of a piping 106. A refrigerant flows through the circuit. By changing over the four-way valve 102, the flow direction of the refrigerant is changed, and a cooling operation or a heating operation can be performed. In such an apparatus, recently, it has been desired to reduce the noise caused by the sound of the refrigerant due to state changes of the refrigerant flowing in the refrigeration cycle. In particular, it has been desired to reduce the noise from the pressure reducing means 104a, 104b, in which pressure changes are significant and the refrigerant is present in a gas-liquid two-phase flow, to reduce the noise from a discharge piping 112 of the compressor 101 in which pressure pulsations are large, to reduce the noise from a distributor 107 for distributing the refrigerant to the outdoor heat exchanger 103 and the indoor heat exchangers 105a, 105b uniformly, and to reduce the noise from the parts of the outdoor heat exchanger 103 and indoor heat exchangers 105a, 105b in which the piping 106 is crowded. Against these noise sources, hitherto, various noise reducing measures have been attempted.

For example, as a noise reducing measure for noise generated from the expansion valve 104a, which is one of the pressure reducing means, in Japanese Laid-open Patent No. 5-113272, a silencer combining an expansion type muffler and a porous plate is disposed in the low pressure side piping 106 of the expansion valve 104a. The expansion muffler is divided into two compartments by the porous plate, and it is designed to suppress the flowing noise of the refrigerant by adjusting the pore diameter or number of pores of the porous plate.

In Japanese Laid-open Patent No. 6-26738, a taper expanded portion is provided in the high pressure side piping 106 of the expansion valve 104a, and a porous plate is disposed in the expanded portion. In the expanded portion, bubbles of the gas refrigerant contained in the liquid refrigerant are preliminarily transformed into smaller bubbles to attenuate the energy thereof, and noise due to collision of the gas refrigerator against the expansion valve 104a is prevented.

According to Japanese Laid-open Patent No. 8-313113, a distributor 107 for diverging the refrigerant into two flows and converging them later is provided in the high pressure side piping 106 of the expansion valve 104a. By dividing and mixing the gas-liquid two-phase flow refrigerant, the liquid refrigerant and gas refrigerant are mixed uniformly, so that generation of flowing noise of the refrigerant is reduced or prevented.

In Japanese Laid-open Patent No. 9-133434, in the piping 106 before and after the expansion valve 104a, the piping diameter ratio is changed, and an expansion muffler is provided therein, or a rubber vibration absorber is wound around the piping. Sudden pressure changes are lessened by reducing the diameter of the piping 106, and the flowing noise of the refrigerant and the piping vibration noise are attenuated.

As a pulsation reducing measure of gas refrigerant coming out from the compressor 101, in Japanese Laid-open Utility Model No. 6-14685, an expansion muffler having noise absorbing bristles formed in the inner wall thereof is disposed in the discharge piping 112 of the compressor 101, wherein the motion energy of the gas refrigerant is absorbed, and resonance is prevented, so that the pulsation is decreased.

According to Japanese Laid-open Patent No. 9-250844 and Japanese Laid-open Patent No. 9-250845, an expansion muffler is provided in the discharge piping 112 of the compressor 101, and a partition board is provided in the expansion muffler. Pores are pierced in the partition board. Alternatively, plural overlapping partition boards are provided in the expansion muffler. Or, the expansion muffler is formed as a double structure. With these constructions, pulse waves of the gas refrigerant discharged from the compressor 101 are absorbed to suppress the noise.

Moreover, as a reducing measure of the noise generated from the distributor 107 for dividing the refrigerant flow, in Japanese Laid-open Patent No. 5-322379, a strainer 119 and a porous plate are disposed in the distributor 107, and the flowing noise of the refrigerant in the distributor 107 is suppressed by adjusting the pore diameter and number of pores of the porous plate.

In Japanese Laid-open Patent No. 5-118709, moreover, a silencer of a variable capacity type is disposed between a capillary tube and an indoor heat exchanger 105a. The noise frequency is detected by a microphone and a frequency analyzer placed in the indoor unit 105a, and the capacity of the silencer is varied so that the silencing effect may be maximum depending on the noise frequency, thereby enhancing the silencing effect of the silencer.

Thus, in the air conditioner, the refrigerant circulating in the refrigeration cycle changes in state depending on the pressure and temperature conditions. The refrigerant discharged from the compressor is a gas refrigerant of high temperature and high pressure, and by heat exchange in the condenser, it becomes a liquid refrigerant of high temperature when flowing into pressure reducing means such as an expansion valve. After passing through the pressure reducing means, it becomes a gas-liquid two-phase refrigerant of low temperature, and it further becomes a gas refrigerant of low temperature and low pressure in the evaporator, which gas refrigerant is sucked into the compressor. Depending on the cycle state, the pulsation of the refrigerant discharged from the compressor increases, and the piping vibration and the noise from the condenser coil increase. Also, when the heat exchange in the condenser is insufficient, the refrigerant flowing into the pressure reducing means becomes a gas-liquid two-phase state, and when reducing the pressure, this leads to an increase of noise from the pressure reducing means or the piping before and after it, or an increase of noise from the condenser coil or evaporator coil.

In the prior art, when using the expansion muffler, distributor or silencer member having a special shape of a gradually increasing sectional area for reducing the noise or decreasing the pressure pulsations, an extra space is needed for installing the silencer around the compressor or around the pressure reducing means. However, it is desired to reduce the noise and pressure pulsations effectively while saving space.

Or, to reduce the noise or decrease the pulsations, a porous plate, a partition board or a strainer is inserted in the silencer. Alternatively, the silencer volume is varied by cooperation with the microphone and frequency analyzer, or a sound absorbing material is provided in the silencer. These measures become large and complicated, while it is desired to simplify the construction and curtail the number of constituent parts of the silencer.

Once installed, it is difficult to change the diameter or number of pores of the porous plate in the silencer, the interval between partition boards, or the length of the expanded portion. Also, the reducing effect is smaller in response to noise frequency characteristic changes due to cycle state fluctuations, while it is desired to decrease the noise or attenuate transmission of pressure pulsations regardless of cycle state fluctuations.

SUMMARY OF THE INVENTION

The invention is hence intended to solve such conventional problems, and it is an objet thereof to present a silencer simplified in construction, not requiring extra space for the silencer, easy to assemble and operate, capable of attenuating transmission of pressure pulsations and reducing flowing noise of refrigerant effectively even when the refrigerant flows in an irregular gas-liquid two-phase state or pulsations are large, and capable of reducing flowing noise of refrigerant and attenuating transmission of pressure pulsations regardless of cycle state fluctuations. It is another object of the invention to provide an air conditioner using this silencer.

To achieve these objects, the silencer of the invention comprises at least one silencer member having a plurality of holes communicating between both ends of the silencer member.

In the invention, since a plurality of silencer members of the same shape are fixed in a piping of a same sectional area, the increase in the number of parts is suppressed to a minimum limit, and the construction is simple, so that a silencer that is easy to assemble and operate is obtained.

Also in the invention, silencer members having a plurality of holes communicating between both ends thereof are arranged in series, and a space is formed between adjacent silencer members, and therefore if the refrigerant flows in an irregular gas-liquid two-phase state or pulsations are large, it is possible to obtain a silencer capable of attenuating transmission of pressure pulsations and reducing flowing noise of refrigerant effectively.

Also in the invention, the volume of the space formed between adjacent silencer members is varied, and this provides a silencer capable of reducing flowing noise of refrigerant and attenuating transmission of pressure pulsations, regardless of cycle state fluctuations.

Further, the air conditioner of the invention has the silencer of the invention disposed at least at the flow-in side or flow-out side of the pressure reducing means, and it is possible to attenuate the noise caused at the time of reducing pressure, the flowing noise of refrigerant, and pressure pulsations caused by an irregular gas-liquid two-phase state.

In the invention, the silencer of the invention is disposed at least at the refrigerant flow-in side or refrigerant flow-out side of the evaporator, and therefore an air conditioner is provided that is capable of reducing flowing noise of refrigerant if the refrigerant flows in an irregular gas-liquid two-phase state in the evaporator.

Also in the invention, the silencer of the invention is disposed at the refrigerant flow-in side of the distributor for dividing the refrigerant into the condenser or evaporator, and thus an air conditioner is provided that is capable of attenuating generation of collision sound of refrigerant due to irregular flow of a gas-liquid two-phase refrigerant in the distributor of the condenser or evaporator.

BRIEF DESCRIPTION OF THE DRAWINGS

FIG. 5 is a noise frequency analysis diagram near the side of an indoor heat exchanger of the indoor unit incorporating the expansion valve.

FIG. 6 is a noise frequency analysis diagram at 1 m from the front of the indoor heat exchanger of the indoor unit incorporating the expansion valve.

FIG. 14 is an essential magnified view of an indoor heat exchanger, liquid side lead pipe, and silencer of the second embodiment.

FIG. 15 is an essential magnified view of another construction of the indoor heat exchanger, liquid side lead pipe, and silencer of the second embodiment.

DETAILED DESCRIPTION OF THE INVENTION

Figure 1:
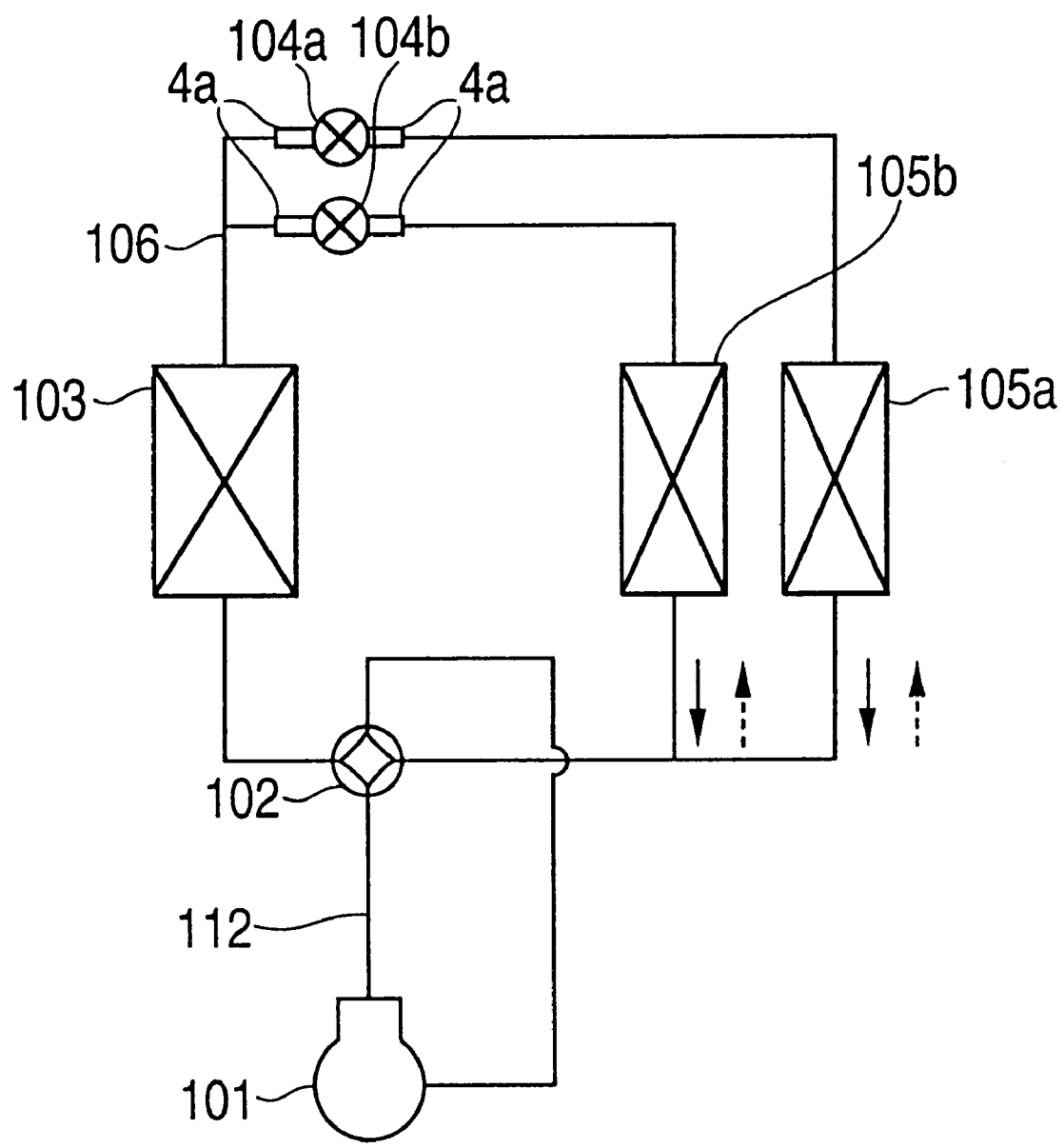
FIG. 1 is a refrigeration cycle diagram of an air conditioner in a first embodiment of the invention.

Referring now to the drawings, embodiments of the invention are described in detail below.

Same parts as in the prior art are identified with same reference numerals, and duplicated description is omitted.

EMBODIMENT 1

Figure 2:
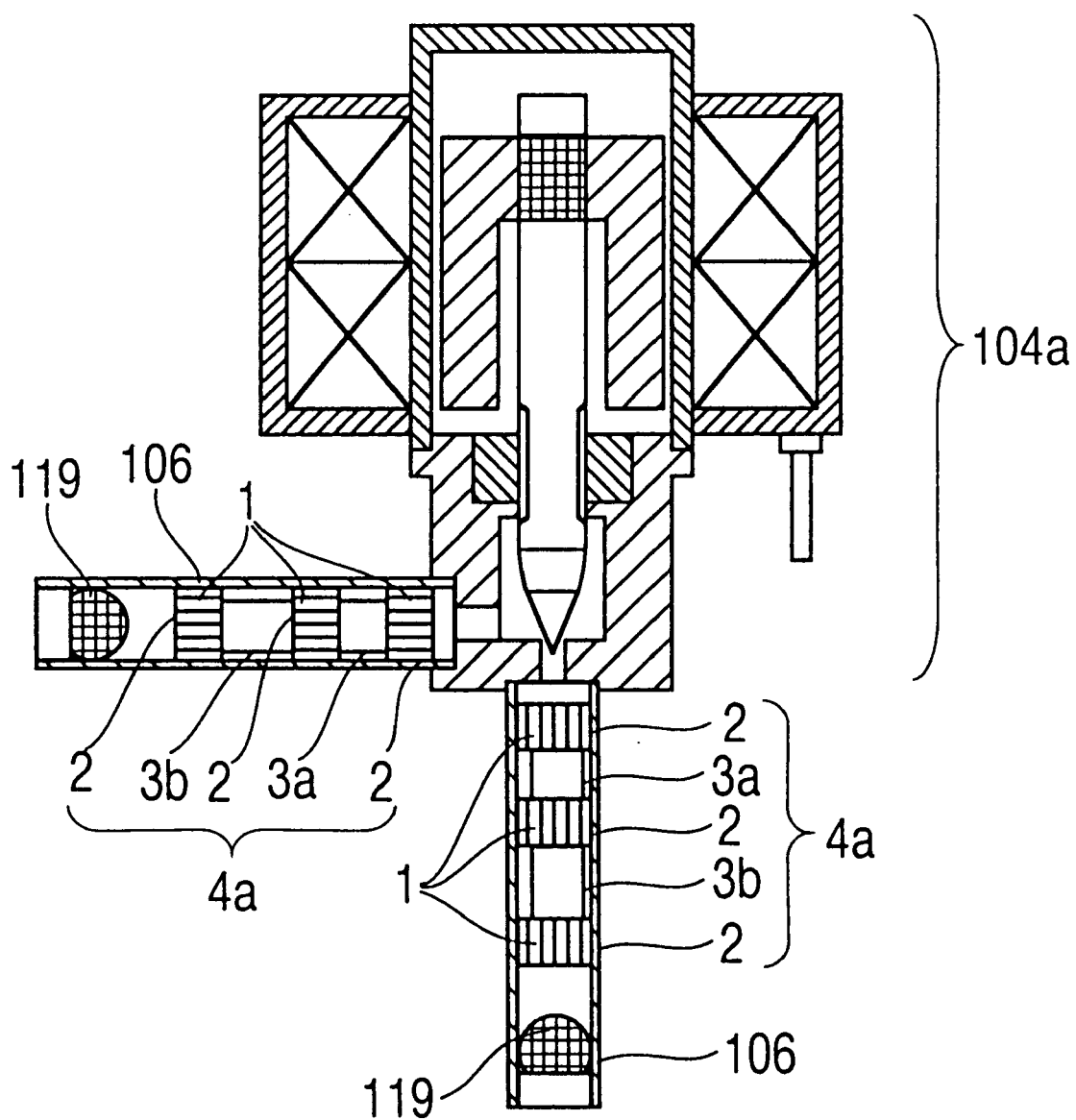
FIG. 2 is an essential magnified sectional view of an expansion valve and silencer of the first embodiment.
Figure 3:
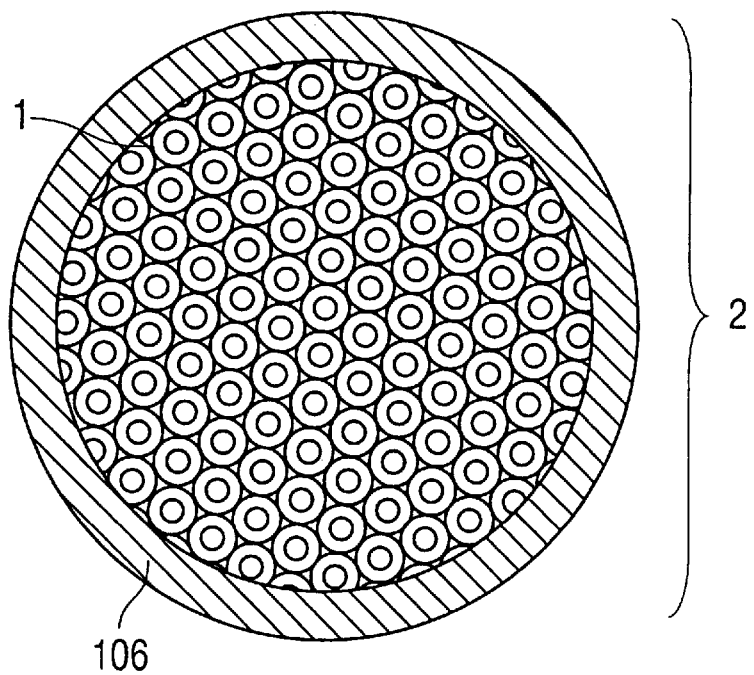
FIG. 3 is a cross sectional view of the silencer.

As shown in FIG. 1, FIG. 2 and FIG. 3, a heat pump type refrigeration cycle is composed of a compressor 101, a four-way valve 102, and outdoor heat exchanger 103, an expansion valve 104a, an expansion valve 104b, and indoor heat exchanger 105a, and an indoor heat exchanger 105b, all being coupled by means of a refrigerant piping 106. A honeycomb pipe 2 bundling a plurality of fine tubes 1 is inserted into the refrigerant piping 106 connected to the flow-in side and flow-out side of the expansion valve 104a and expansion valve 104b. A cylindrical tube 3a whose outside diameter is smaller than the inside diameter of the refrigerant piping 106 is then inserted as a spacer. By further inserting another honeycomb pip 2, cylindrical tube 3b and yet another honeycomb pipe 2 in this sequence, a silencer 4a is formed. The cylindrical tube 3a and cylindrical tube 3b of the spacer are different in length from each other, and by extending the refrigerant piping 106, the silencer 4a formed of the honeycomb pipes 2, cylindrical tube 3a and cylindrical tube 3b is fixed in the refrigerant piping 106. At the outer side of the finally inserted honeycomb pipe 2, finally inserted is a strainer 119 for removing foreign matter mixed in the refrigerant. Strainer 119 is fixed to the refrigerant piping 106 by belting.

In this construction, in the case of a cooling operation (solid line arrow in diagram), the gas refrigerant of high temperature and high pressure discharged from the compressor 101 passes through the discharge piping 112 and four-way valve 102, and exchanges heat with the fresh air blown by an outdoor fan (not shown) in the outdoor heat exchanger 103 to become liquid refrigerant of high temperature and high pressure, and then flows into the expansion valve 104a and expansion valve 104b. The refrigerant flowing into the expansion valve 104a and expansion valve 104b is decompressed to be a gas-liquid two-phase refrigerant of low temperature and low pressure, and then flows out of the expansion valves 104a and 104b. The refrigerant flowing out of the expansion valve 104a and expansion valve 104b exchanges heat with the indoor air blown out by an outdoor fan (not shown) in the indoor heat exchanger 105a and indoor heat exchanger 105b, respectively, and then flows out from the heat exchangers as gas refrigerant of low temperature and low pressure, and then passes through the four-way valve 102 and is sucked into the compressor 101. Usually, the refrigerant flowing into the expansion valve 104a and expansion valve 104b is in a liquid state, but depending on the cycle state, it may be formed as a gas-liquid two-phase state mixing liquid refrigerant and gas refrigerant. When this gas-liquid two-phase refrigerant, which is different in density and flow velocity, flows in the refrigerant piping 106, the pressure pulsations increase, and when decompressed in different density states, the noise during decompression increases. When the refrigerant flowing into the expansion valve 104a is in a gas-liquid two-phase state, the refrigerant passes through the silencer 4a provided in the refrigerant piping 106 at the flow-in side of expansion valve 104a. The gas-liquid two-phase refrigerant collides against the honeycomb pipe 2 and receives resistance, and both liquid refrigerant and gas refrigerant are dispersed, and flow into the fine tubes 1 forming the honeycomb pipe 2. Since the flow routes are mutually partitioned by the plurality of fine tubes 1, the refrigerant flowing into each fine tube 1 does not interfere with each other, and flows in each fine tube 1 so as to be homogenized and straightened. The refrigerant passing through the fine tubes 1 flows out into the space formed by the cylindrical tube 3b. Since the opening sectional area of the cylindrical tube 3b is relatively larger than the opening sectional area of the honeycomb pipe 2, the refrigerant passing through the cylindrical tube 3b is expanded, and pressure pulsations are attenuated. Furthermore, as the refrigerant passes through the honeycomb pipe 2 and cylindrical tube 3a, it is homogenized, straightened, and enhanced during the pressure pulsation decreasing effect, and then flows into the expansion valve 104a. While being decompressed by the expansion valve 104a, since the non-uniformity of refrigerant density and pressure pulsations decrease, the noise during compression is decreased. The gas-liquid two-phase refrigerant, after decompression, repeats homogenization and expansion in the process of passing through the another honeycomb pipe 2, cylindrical tube 3a, yet another honeycomb pipe 2, and cylindrical tube 3b, and the noise during decompression and transmission of pressure pulsations are attenuated. Since the resistance at the time of decompression in the expansion valve 104a is very large, the resistance at the time of passing through the honeycomb pipes 2 will not cause adverse effects on the refrigerant cycle. Frequency characteristics of pressure pulsations and frequency characteristics of noise vary depending on the rate of the liquid refrigerant and gas refrigerant in the gas-liquid two-phase refrigerant, but by varying the combination of the length of the cylindrical tube 3a and the length of the cylindrical tube 3b, it is possible to cope with the frequency of high sound pressure level and the frequency of large attenuation, and therefore the noise is reduced and the transmission of pressure pulsations can be attenuated without being affected by variations of cycle state.

Figure 4:
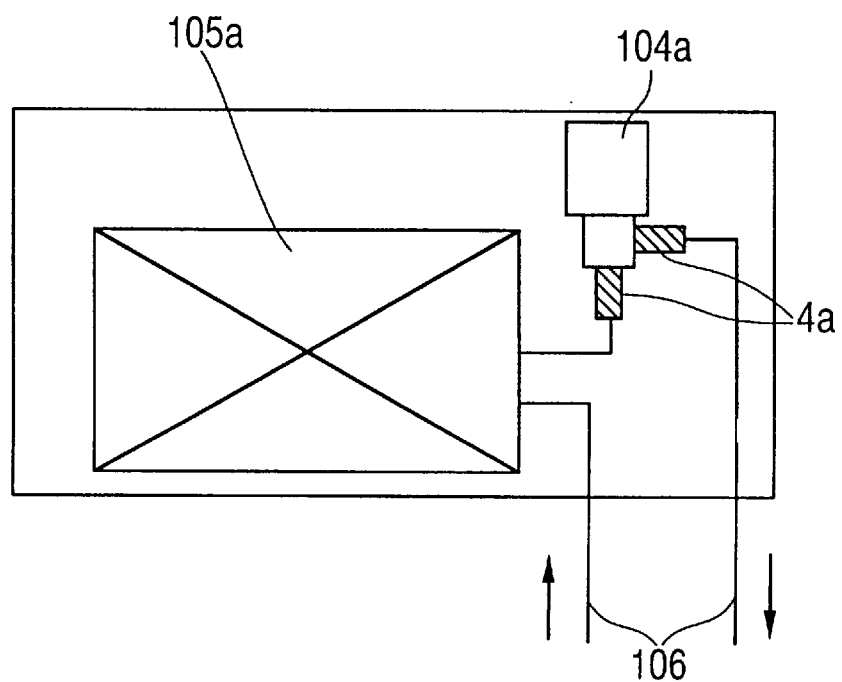
FIG. 4 is a structural diagram of an indoor unit incorporating the expansion valve.
Figure 7:
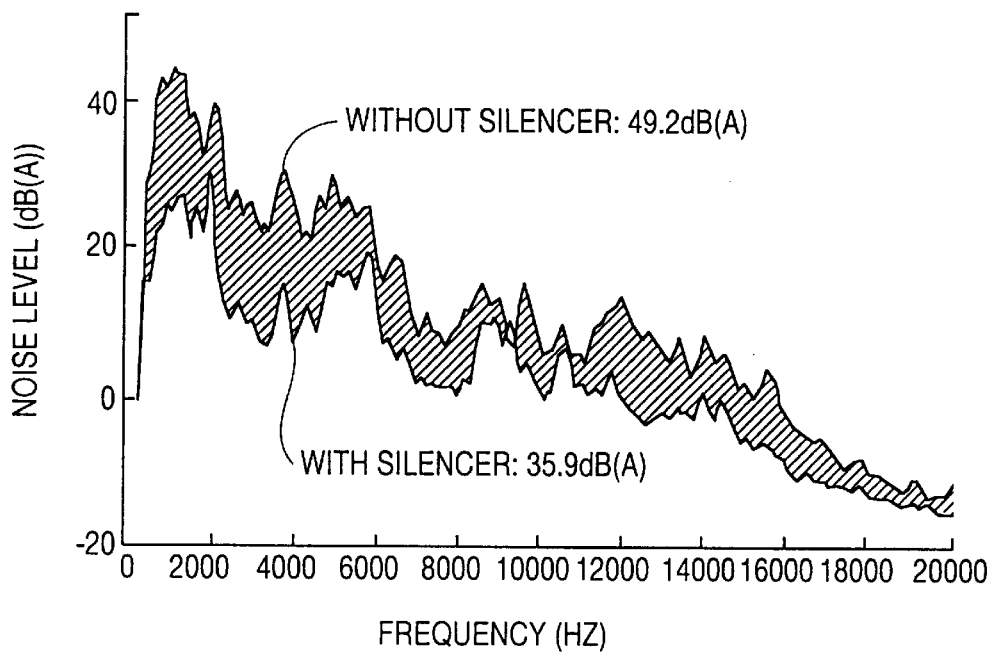
FIG. 7 is a noise frequency analysis diagram near the side of the indoor heat exchanger of the indoor unit incorporating the expansion valve.
Figure 8:
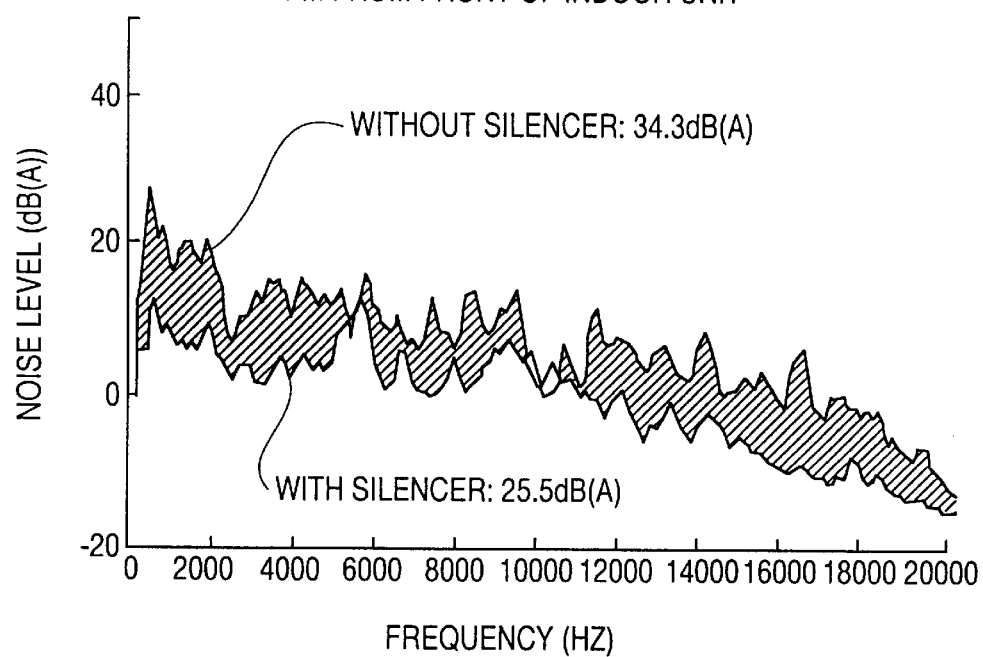
FIG. 8 is a noise frequency analysis diagram at 1 m from the front of the indoor heat exchanger of the indoor unit incorporating the expansion valve.

On the other hand, in the case of a heating operation (broken line arrow in the diagram), the four-way valve 102 is changed over, and the flowing direction of the refrigerant is reversed relative to the case of a cooling operation. If the state of the refrigerant flowing into the expansion valve 104a and expansion valve 104b is a gas-liquid two-phase refrigerant, by the same action as mentioned in the cooling operation, the noise can be reduced, and transmission of pressure pulsations can be attenuated. However, in the case of the refrigeration cycle formed as the multi-compartment air conditioner as shown in this embodiment, for example, the indoor heat exchanger 105a is operated while the indoor heat exchanger 105b is stopped, and in such a circumstance, the heat exchanger 105b is not closed fully, but is slightly opened, so that the refrigerant may not be stagnant in the stopped indoor heat exchanger 105b and the refrigerant piping 106 connected to the indoor heat exchanger 105b. Accordingly, the refrigerant flowing into the expansion valve 104b is a gas-liquid two-phase state large in the rate of gas refrigerant, but in the process of passing through the silencer 4a, homogenization and expansion are repeated, and the flowing noise of the refrigerant can be reduced and pressure pulsations can be attenuated, and moreover, the flowing noise of the refrigerant and the pressure pulsations transmitted from the expansion valve 104b through the refrigerant piping 106 can be also attenuated. Since the silencer 4a is composed by making use of part of the refrigerant piping 106, extra space for installing the silencer 4a is not needed, and the construction of parts is simple, and it is easy to assemble and operate. FIG. 4 shows a state of assembling the expansion valve 104a into the indoor heat exchanger 105a. The heating operation is stopped in the shown state, and the noise frequency characteristic when the indoor heat exchanger 105b is put in a heating operation is shown in FIG. 5, FIG. 6, FIG. 7, and FIG. 8. In FIG. 5, and FIG. 6, the silencer 4a is inserted into two refrigerant pipings 106 communicating with the expansion valve 104a, and fixed by crimping at both ends, in which one honeycomb pipe 2 is used as the silencer 4a, and fine tubes in the honeycomb pipe 2 are 0.2 mm in inside diameter and 5 mm in length, and the aperture rate is about 20%. FIG. 5 shows the noise frequency characteristic measured near the side of the indoor heat exchanger 105a, and FIG. 6 is the noise frequency characteristic measured at a position 1 m from the front of the indoor heat exchanger 105a. In the silencer 4a used in FIG. 7 and FIG. 8, the fine tubes 1 in the honeycomb pipe 2 are 0.2 mm in inside diameter, and the aperture rate is about 20%. Three honeycomb pipes 2 of 5 mm in length are used, and the length of cylindrical tube 3a and cylindrical tube 3b is 5 mm. This silencer 4a is inserted into two refrigerant pipings 106 communicating with the expansion valve 104a, and fixed by crimping at both ends. Since the length, 5 mm, is longer than the pipe inside the diameter of 0.2 mm, a sufficient straightening effect is obtained, and transmission of pressure pulsations and noise is attenuated. Also, the noise level at 4 kHz or less is substantially reduced, and it is known that the radiation noise from the indoor heat exchanger 105a is smaller. Moreover, by homogenizing the two-phase flow refrigerant, the noise level at kHz or more is also reduced, and it is possible to attenuate the irregular refrigerant passing noise in the decompression process of the expansion valve 104a.

In this embodiment, the heat pump type refrigeration cycle is explained, but the same silencing effects are obtained in the exclusive cooling cycle.

The driving means of the expansion valve is explained as a motor-driven system using a rotor and a stator as shown in FIG. 2, but it may also be other systems. It may be a temperature system for deforming a diaphragm by the gas pressure changing in response to the temperature detected by a temperature sensing tube. It may be a manual system for adjusting the manual throttling action of the refrigerant. It may be a rated pressure system for operating the valve by the pressure in the evaporator. Or it may be a pilot system for operating by the pressure and temperature of the suction vapor coming out from the evaporator.

The shape of the shown valve is acicular, but may be formed in spherical, cam or cylindrical shape, and there is no difference in action and effect. The shown stator is fitted to the outside of the case in the so-called external fitting shape, but it may be accommodated in the case as a built-in type.

The consistent member of the honeycomb pipe used as homogenizing means or refrigerant is a bundle of plural fine tubes, but it may also be constituted by forming communicating holes in a cylinder.

The plural fine tubes are same in diameter, but fine tubes of different diameters may be also combined.

Instead of arranging honeycomb pipes having the same opening area arranged adjacently honeycomb pipes having different opening areas may be arranged adjacently.

The structure of the honeycomb pipe is cylindrical, but it may be also formed in a polygonal shape.

A cylindrical tube is used for keeping the clearance between adjacent honeycomb pipes, but a polygonal tube may be also used.

Honeycomb pipes are used as homogenizing means of refrigerant, but porous metal or porous ceramic may be also used.

As the fixing method of honeycomb pipes, the refrigerant piping is expanded, but it may also be realized by press-fitting into the refrigerant piping, or crimping or belting at both ends of the honeycomb pipes.

A cylindrical tube is used for keeping the clearance between adjacent honeycomb pipes, but the clearance may be also kept by belting or crimping the refrigerant piping, or another shape other than cylindrical can be used for the tube, or structure other than a pipe maybe used.

The number of honeycomb pipes for forming the silencer is three and the number of cylindrical tubes is two, but each number may be less than three or less than two, or three or more or two or more, respectively.

Each cylindrical tube differs in length, but tubes of same length may also be used.

The silencer mounting position is in the refrigerant piping, but it may be formed as part of an expansion valve, or the silencer may be made of one member, and coupled to the refrigerant piping by brazing, soldering, or flaring it into union joint.

The silencer is provided between the expansion valve and strainer, but the strainer may be disposed between the silencer and the expansion valve.

Figure 9:
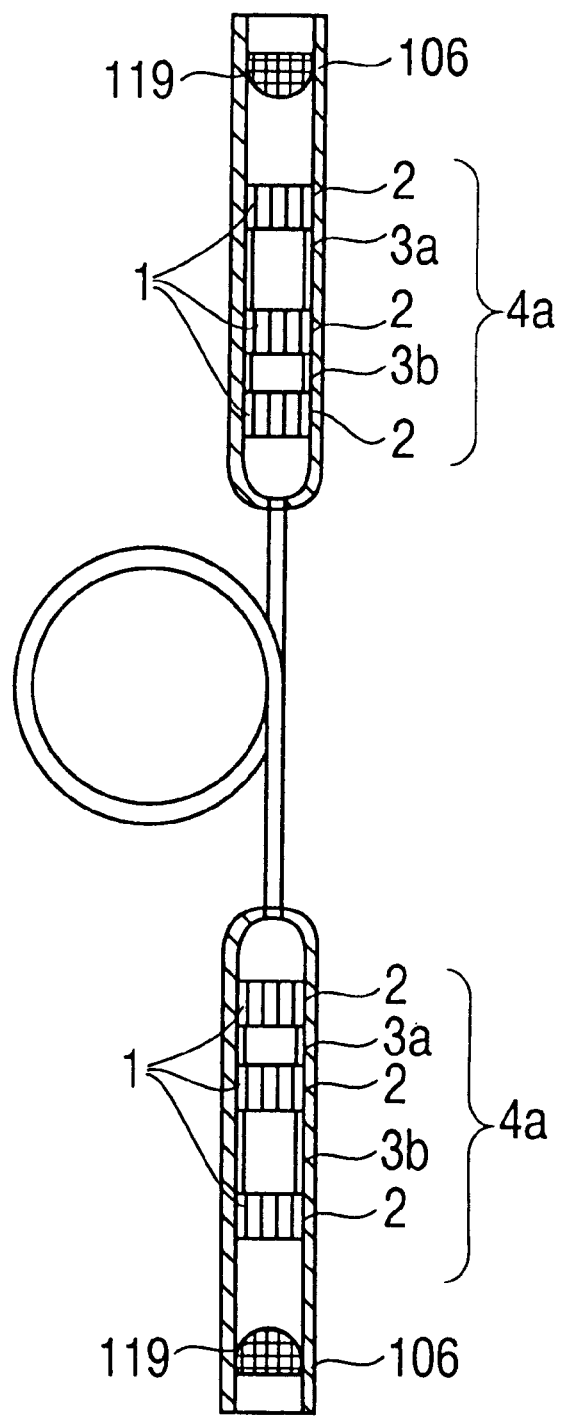
FIG. 9 is an essential magnified view of a capillary tube and silencer of the first embodiment.

Or as shown in FIG. 9, instead of the expansion valve, a capillary tube may be used as the pressure reducing means. The number of indoor heat exchangers is not limited to two, but may be one or three or more.

EMBODIMENT 2

Figure 10:
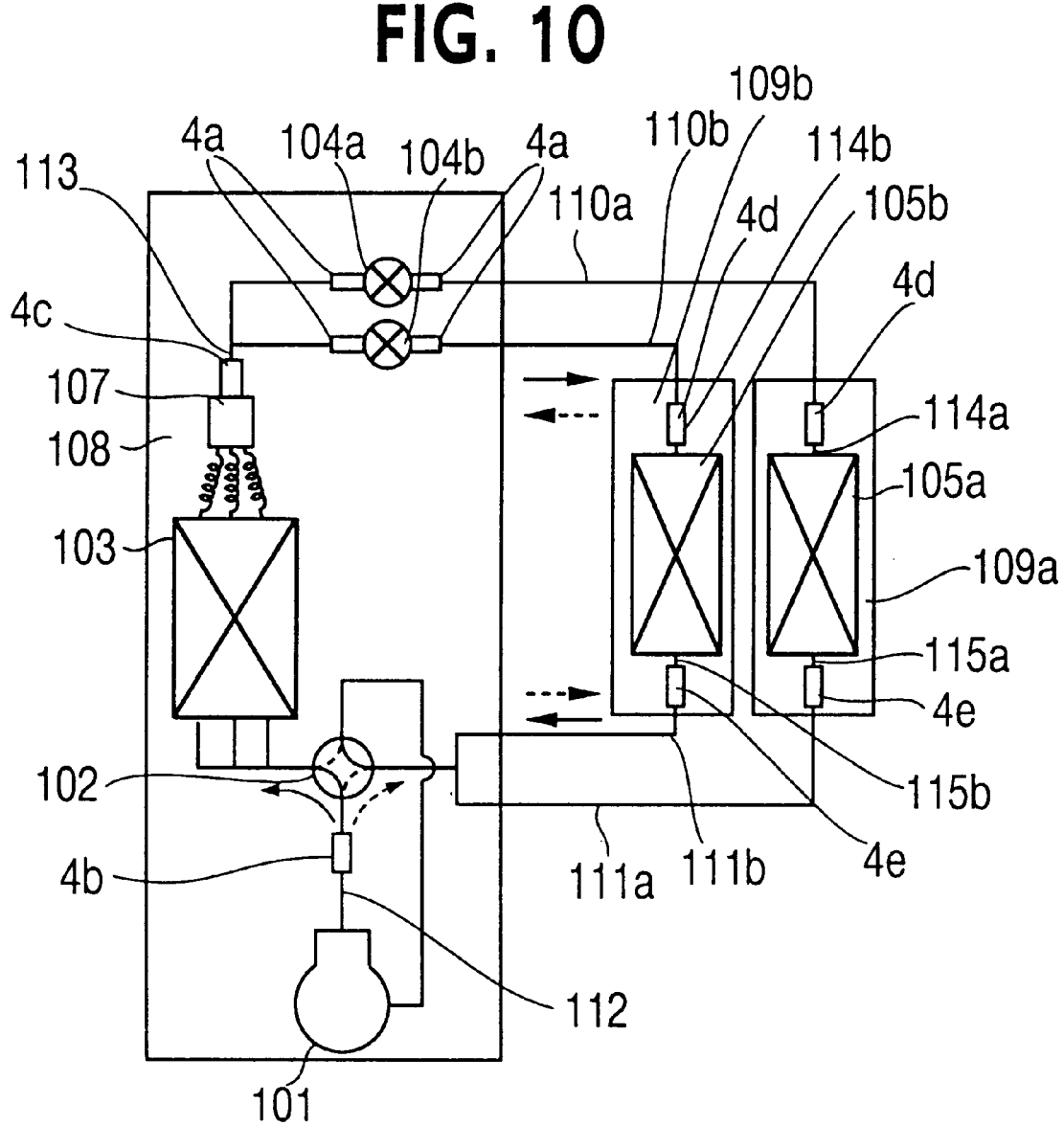
FIG. 10 is a refrigeration cycle diagram of an air conditioner of a second embodiment of the invention.

FIG. 10 is a refrigeration cycle diagram of an air conditioner in a second embodiment of the invention. This is a refrigeration cycle of a multi-compartment type air conditioner for conditioning the air in plural rooms composed of a compressor 101 for compressing a refrigerant, a four-way valve 102 for changing over the passage of the refrigerant compressed and discharged by the compressor 101, a multi-pass type outdoor heat exchanger 103 connected to one end of the four-way valve 102, for exchanging heat between fresh air and the refrigerant, having plural refrigerant passages, a distributor 107 for distributing the refrigerant into each passage of the outdoor heat exchanger 103, an outdoor unit 108 composed of expansion valves 104a, 104b and others as decompressing means for decompressing and adjusting the flow rate of the refrigerant being branched and connected from the distributor 107, and indoor units 109a, 109b composed of indoor heat exchangers 105a, 105b and others for exchanging heat between indoor air and the refrigerant, which are connected through liquid side piping 110a, 110b and gas side pipings 111a, 111b.

Inside the outdoor unit 108, a discharge piping 112 for guiding the refrigerant discharged from the compressor 101 into the four-way valve 102 is provided, and a silencer 4b is built in this discharge piping 112, while a silencer 4c is provided in a convergent piping 113 for connecting the expansion valves 104, 104b and the convergent side of the distributor 107.

Inside the indoor unit 109a, a silencer 4d is provided in liquid side lead pipe 114a for connecting the indoor heat exchanger 105a and liquid side piping 110a, and a silencer 4e is provided in a gas side lead pipe 115a for connecting the indoor heat exchanger 105a and gas side piping 111a. Similarly, inside the indoor unit 109b, another silencer 4d is provided in a liquid side lead pipe 114b for connecting the indoor heat exchanger 105b and liquid side piping 110b, and another silencer 4e is provided in a gas side lead pipe 115b for connecting the indoor heat exchanger 105b and gas side piping 111b.

For this construction, the operating action is described. When the indoor unit 109a is put in a cooling operation, the gas refrigerant of high temperature and high pressure state compressed and discharged from the compressor 101 flows in the direction indicated by the solid line by means of th four-way valve 102 into the outdoor heat exchanger 103. The refrigerant flowing into the outdoor heat exchanger 103 exchanges heat with the fresh air blown in from an outdoor fan (not shown), and is condensed and liquefied. The condensed and liquefied refrigerant totally flows into the expansion valve 104a, because the expansion valve 104b provided in the piping system of the indoor unit 109b is not put in operation and is completely closed. In the expansion valve 104a, the flow rate of the refrigerant is adjusted, and the refrigerant is decompressed to be a gas-liquid mixed two-phase state, and passes through the liquid side piping 110a, and flows into the indoor heat exchanger 105a. The refrigerant flowing into the indoor heat exchanger 105a exchanges heat with the indoor air blown in from an indoor fan (not shown), and is evaporated and vaporized. The indoor air is deprived of heat by heat exchange with the refrigerant, and the indoor space air is cooled. The refrigerant evaporated and vaporized by heat exchange with the indoor air returns to the outdoor unit 108 through the gas side pipping 111a, and is sucked into the compressor 101. The refrigerant sucked into the compressor 101 is compressed again and discharged, and repeats the same operation.

Figure 11:
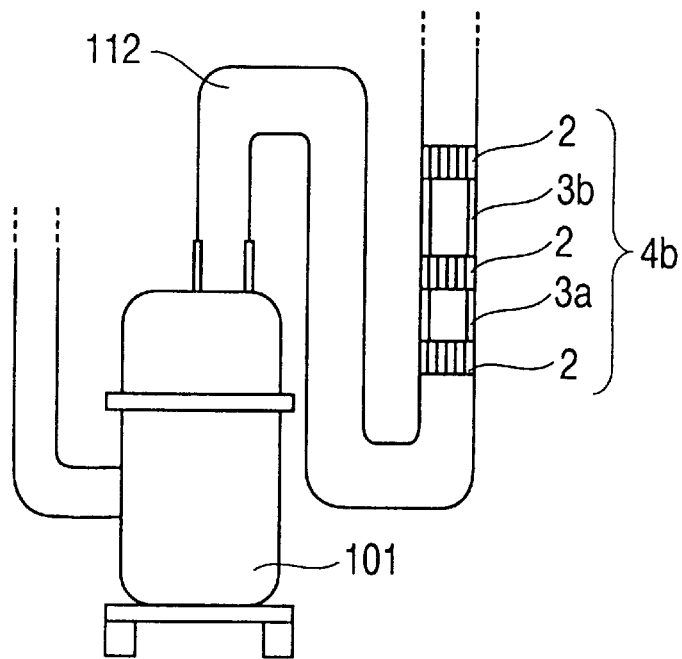
FIG. 11 is an essential magnified view of a compressor, discharge pipe, and silencer of the second embodiment.

If the refrigerant of high temperature and high pressure is discharged from the compressor 101 with large pressure pulsations, that is, if the temperature, pressure, overheat, flow rate and other characteristics of the refrigerant sucked into the compressor 101 are largely fluctuating, or if pressure pulsations occur due to effects of differential pressure before and after the compressing area of the compressor 101, a large amount of pressure pulsation and noise will be generated. Silencer 4b will attenuate the transmission of this pressure pulsation and noise as explained below, while referring to FIG. 11. FIG. 11 is an essential magnified view of the compressor 101, discharge piping 112 and silencer 4b, and as shown in the diagram, the silencer 4b is included in the discharge piping 112 that is joined to the discharge part of the compressor 101 by brazing or welding. The silencer 4b is formed of a honeycomb pipe 2 bundling a plurality of fine tubes 1, a hollow cylindrical tube 3a of which the outside diameter is smaller than the inside diameter of the discharge piping 112, a further honeycomb pipe 2, cylindrical pipe 3b, and yet another further honeycomb pipe 2, which are sequentially inserted into the discharge piping 112. The cylindrical tube 3a and cylindrical tube 3b are different in length, and by extending the discharge piping 1 12, the silencer 4b composed of the honeycomb pipes 2, cylindrical tube 3a and cylindrical tube 3b is fixed in the discharge piping 112.

Figure 12:
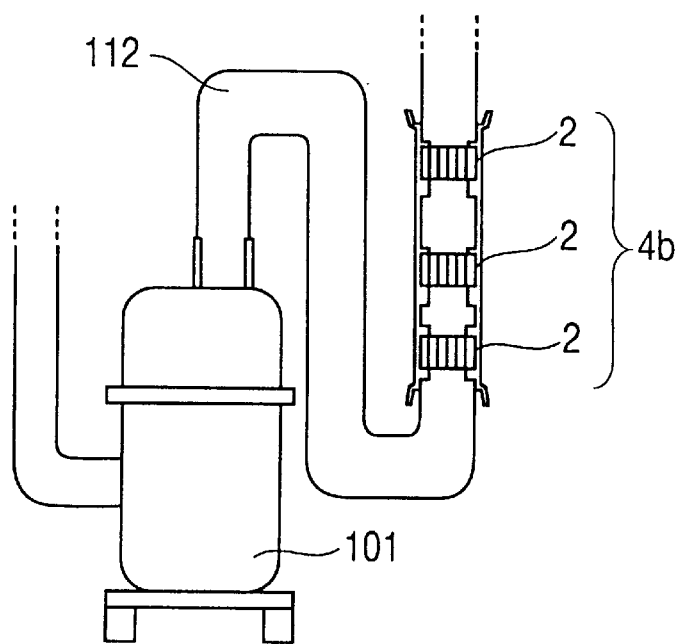
FIG. 12 is an essential magnified view of another construction of the compressor, discharge pipe, and silencer of the second embodiment.
Figure 13:
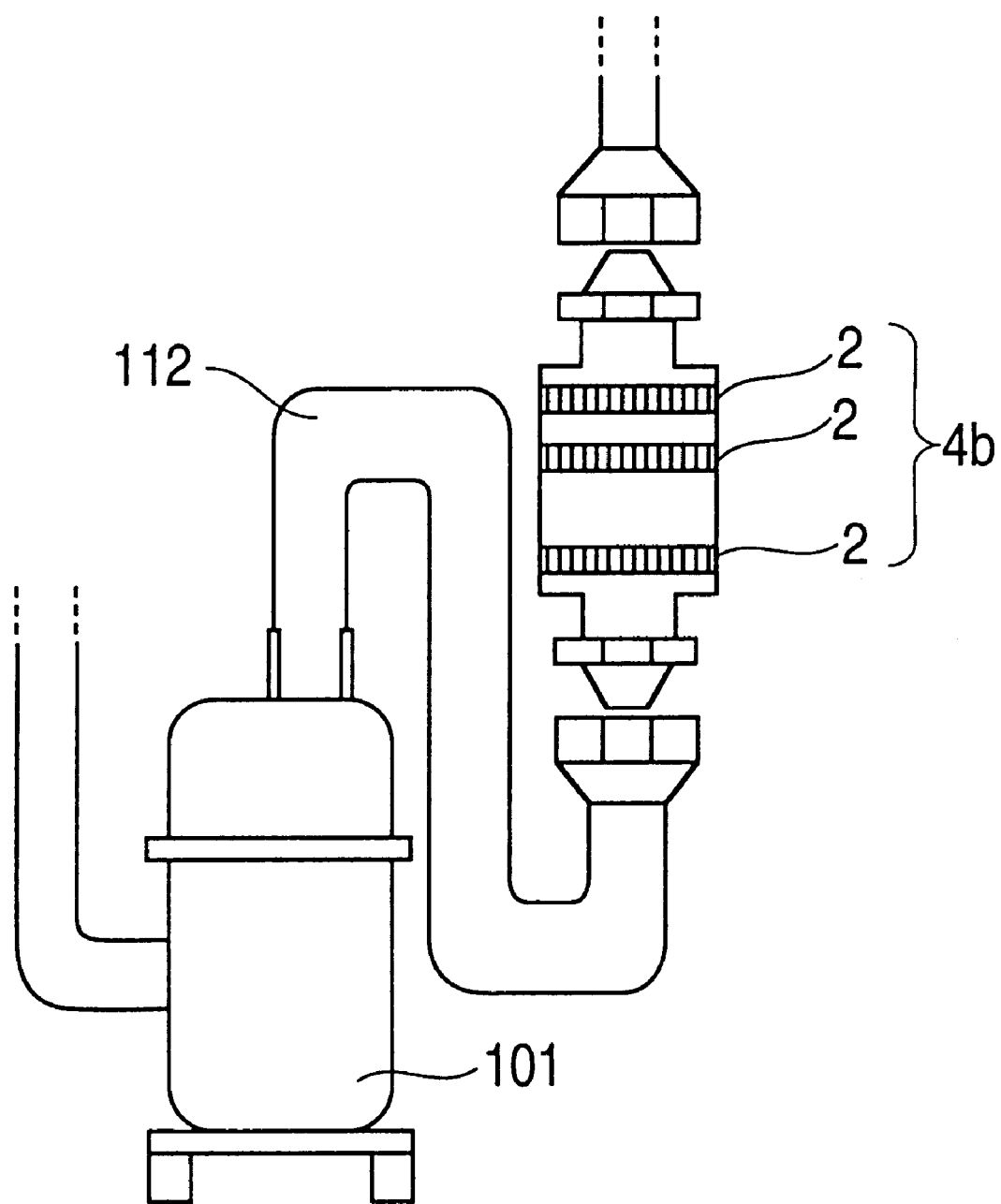
FIG. 13 is an essential magnified view of yet another construction of the compressor discharge pipe, and silencer of the second embodiment.

When a gas refrigerant having large pressure pulsation is discharged from the compressor 101, the gas refrigerant is guided into the discharge piping 112, and passes through the silencer 4b incorporated in the discharge piping 112. The refrigerant flowing into the silencer 4b first collides against the honeycomb pipe 2 and receives resistance, and the energy is dispersed, then it flows into the fine tubes 1 forming the honeycomb pipe 2. Since the plurality of the fine tubes 1 each have mutually different routes, the refrigerant flowing into each fine tube 1 continues to flow in each fine tube 1 without interfering with the refrigerant flowing in each other fine tube 1, is straightened, and then flows out into the space formed by the cylindrical tube 3a. Since the opening sectional area of the cylindrical tube 3a is relatively wider than the opening sectional area of the honeycomb pipe 2, the refrigerant passing through the cylindrical tube 3a is expanded, and the pressure pulsations are attenuated. Further, as the refrigerant sequentially passes through the another honeycomb pipe 2, cylindrical tube 3b, and yet another honeycomb pipe 2, the straightening effect and pressure pulsation decreasing effect are enhanced, and then it flows out from the silencer 4b. The refrigerant flowing out from the silencer 4b passes through the four-way valve 102, and flows into the outdoor heat exchanger 103. At this time, since the pressure pulsations of the refrigerant flowing into the outdoor heat exchanger 103 are sufficiently attenuated, the refrigerant radiation of sound in the outdoor heat exchanger 103 due to pressure pulsations of the refrigerant is sufficiently decreased, while the piping vibration due to pressure pulsations is attenuated, and thus the reliability of the machine is enhanced. Moreover, frequency characteristics of pressure pulsations and frequency characteristics of noise vary depending on the refrigerant temperature, pressure, flow rate and other characteristic, but by changing the combination of the length of the cylindrical tube 3a and length of the cylindrical tube 3b, it is possible to control the frequency of a high sound pressure level, and the frequency of large attenuation, so that reduction of noise and attenuation of transmission of pressure pulsation are achieved regardless of cycle state fluctuations. In this embodiment, the silencer 4b is fixed by extending the discharge piping 112, but it may also be fixed by crimping or belting the piping 112 at both ends of the silencer 4b, and the interval between the adjacent honeycomb pipes 2 is kept by using the cylindrical tube 3a, 3b. But the interval may also be kept by belting or crimping the piping, or by using tubes of a shape other than cylindrical, or by using structure other than tubes. Further, instead of placing the silencer 4b in the discharge piping 112, the silencer 4b may be formed as a different part, and attached to the discharge piping 112 by brazing, welding, making a flare connection or the like. For example, as shown in FIG. 12, the silencer 4b may be separately brazed to the discharge piping 112, and the honeycomb pipes 2 are fixed and the interval kept by belting. Or as shown in FIG. 13, the silencer 4b may be made of a separate part differing in a diameter from that of the discharge piping 112, and is connected to the discharge piping 112 by making a flare connection, and the honeycomb pipes 2 are fixed and the interval kept by crimping.

If the ration of the gas refrigerant and liquid refrigerant of the gas-liquid two-phase refrigerant flowing into the indoor heat exchanger 105a fluctuates largely, that is, if the temperature or pressure state fluctuates largely when starting the operation of the compressor 101, stopping the operation, or changing the rotating speed, or if the refrigeration cycle shows an unstable behavior due to the difference in height in the configuration of the outdoor unit 108 and indoor unit 109a, a large amount of pressure pulsation and noise will be generated. Silencer 4d will attenuate the transmission of this pressure pulsation and nosie as explained by referring to FIG. 14. FIG. 14 is an essential magnified view of the indoor heat exchanger 105a, liquid side lead pipe 114a, and silencer 4d, and as shown in the diagram the liquid side lead pipe 114a is joined to the refrigerant flow-in part of the indoor heat exchanger 105a by brazing or welding, and the silencer 4d is included in the liquid side lead pipe 114a. The silencer 4d is composed the same as is the silencer 4b, and is formed of a honeycomb pipe 2 bundling a plurality of fine tubes 1, a hollow cylindrical tube 3a of an outside diameter that is smaller than the inside diameter of the liquid side lead pipe 114a, a further honeycomb pipe 2, cylindrical tube 3b, and yet another further honeycomb pipe 2, which are sequentially inserted into the liquid side lead pipe 114a. The cylindrical tube 3a and cylindrical tube 3b are different in length, and by extending the liquid side lead pipe 114a, the silencer 4d composed of the honeycomb pipes 2, cylindrical tube 3a and cylindrical tube 3b is fixed in the liquid side lead pipe 114a.

Figure 16:
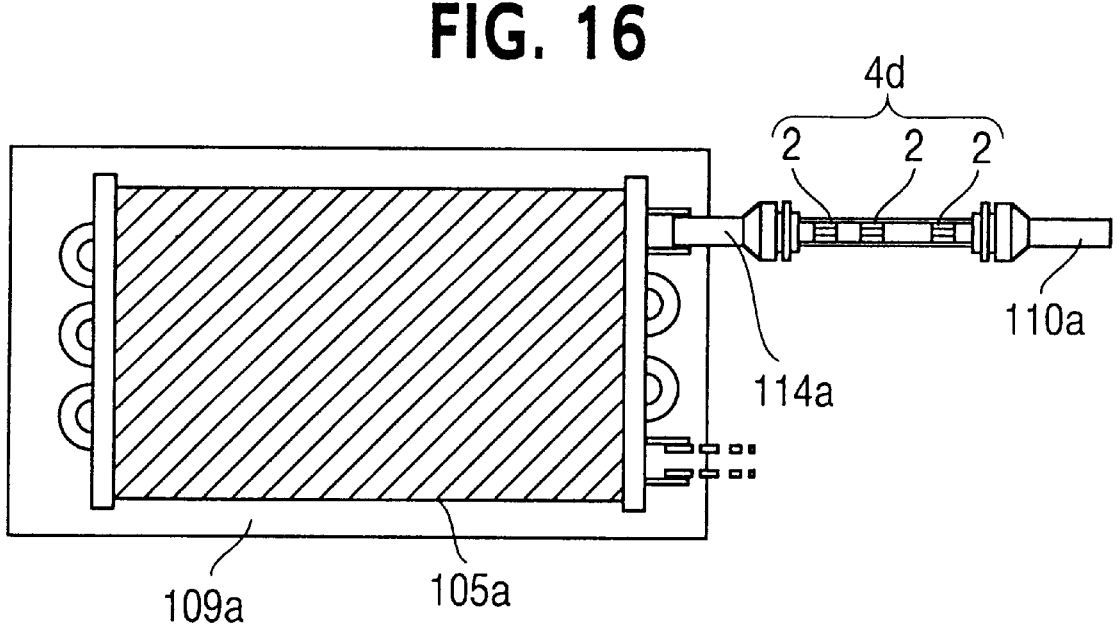
FIG. 16 is an essential magnified view of yet another construction of the indoor heat exchanger liquid side lead pipe, and silencer of the second embodiment.

If an unstable gas-liquid two-phase refrigerant fluctuating in the ratio of gas refrigerant and liquid refrigerant flows into the liquid side lead pipe 114a, the refrigerant passes through the silencer 4d provided in the liquid side lead pipe 114a. The gas-liquid two-phase refrigerant flowing into the silencer 4d first collides against the honeycomb pipe 2 and receives resistance, and both liquid refrigerant and gas refrigerant are dispersed, and then flow into the fine tubes 1 forming the first honeycomb pipe 2. Since the plurality of the fine tubes 1 each have mutually different routes, the refrigerant flowing into each fine tube 1 continues to flow in each fine tube 1 without interfering with the refrigerant flowing in each other fine tube 1, so that the refrigerant is homogenized and straightened. The refrigerant passing through the fine tubes 1 flows out into the space formed by the cylindrical tube 3a. Since the opening sectional area of the cylindrical tube 3a is relatively wider than the opening sectional area of the honeycomb pipe 2, the refrigerant passing through the cylindrical tube 3a is expanded, and the pressure pulsations are attenuated. Further, as the refrigerant sequentially passes through the another honeycomb pipe 2, cylindrical tube 3b, and yet another honeycomb pipe 2, the homogenizing, straightening, and pressure pulsation decreasing effects are enhanced, and then it flows out from the silencer 4d. The refrigerant flowing out from the silencer 4d flows into the indoor heat exchanger 105a. At this time, since the gas-liquid two-phase refrigerant flowing into the indoor heat exchanger 105a is sufficiently homogenized in the gas phase and liquid phase, and is sufficiently attenuated in pressure pulsations, in the indoor heat exchanger 105a it is possible to reduce sufficiently the refrigerant flowing noise due to uneven flow of the gas-liquid two-phase refrigerant and refrigerant radiation noise due to pressure pulsations. Moreover, frequency characteristics of pressure pulsations and frequency characteristics of noise vary depending on the rate of the liquid refrigerant and gas refrigerant in the gas-liquid two-phase refrigerant, but by changing the combination of the length of the cylindrical tube 3a and length of the cylindrical tube 3b, it is possible to combine the frequency of high sound pressure level and the frequency of large attenuation, so that reduction of noise and attenuation of transmission of pressure pulsation can be achieved regardless of cycle state fluctuations. In this embodiment, the silencer 4d is fixed by extending the liquid side lead pipe 114a, but it may be also fixed by crimping or belting at both ends of the silencer 4d, and the interval of the adjacent honeycomb pipes 2 is kept by using the cylindrical tubes 3a, 3b. But the interval may also be kept by belting or crimping the piping, or by using tubes of a shape than cylindrical, or by using structure other than tubes. Further, instead of placing the silencer 4d in the liquid side lead pipe 114a, the silencer 4d may be formed as a different part, and attached to the liquid side lead pipe 114a by brazing welding, making a flare connection or the like. Moreover, instead of being disposed the liquid side lead pipe 114a, the silencer 4d may also be placed between the liquid side lead pipe 114a and liquid side piping 110a. For example, as shown in FIG. 15, the silencer 4d may be made of a different part differing in diameter from that of the liquid side lead pipe 114a, and brazed to the liquid side lead pipe 114a, an the honeycomb pipes 2 fixed and the interval kept by crimping. Or, as shown in FIG. 16, the silencer 4d may be made of a separate part and disposed outside of the indoor unit 109a, and may be placed between the liquid side lead pipe 114a and liquid side piping 110a by making a flare connection.

The operation mode of a heating operation of the indoor unit 109a is described below while referring to FIG. 10. The gas refrigerant of high temperature and high pressure compressed and discharged from the compressor 101 flows in the direction indicated by the broken line by means of the four-way valve 102. Herein, the expansion valve 104b provided in the system of the indoor unit 109b is not put in operation and is set at a minimum opening degree for preventing staying of liquid refrigerant in the indoor heat exchanger 105b, and therefore the refrigerant after passing through the four-way valve 102 is distributed into the indoor units 109a, 109b depending on the opening degree of the expansion valves 104a, 104b, and then flows into the indoor heat exchangers 105a, 105b through the gas side piping 111a, 111b. The refrigerant flowing into the indoor heat exchanger 105a exchanges heat with the indoor air blown in from an indoor fan (not shown), and is condensed and liquefied. The indoor air absorbs heat by heat exchange with the refrigerant, and heats the indoor space air. The refrigerant condensed and liquefied by heat exchange with the indoor air passes through the liquid side piping 110a, and returns to the outdoor unit 108, and is decompressed by the expansion valve 104a to be in gas-liquid mixed two-phase state. The refrigerant flowing into the indoor heat exchanger 105b passes through the indoor heat exchanger 105b, flows through the liquid side piping 110b, returns to the outdoor unit 108, is decompressed by the expansion valve 104b, is then converged with th refrigerant passing through the expansion valve 104a, and then flows into the distributor 107. The refrigerant from the distributor 107 is divided to flow into each route of the outdoor heat exchanger 103. Inside the outside heat exchanger 103, the refrigerant exchanges heat with the fresh air blown in from an outdoor fan (not shown), and is evaporated and vaporized. The evaporated and vaporized refrigerant passes again through the four-way valve 102, and is sucked into the compressor 101.

Figure 17:
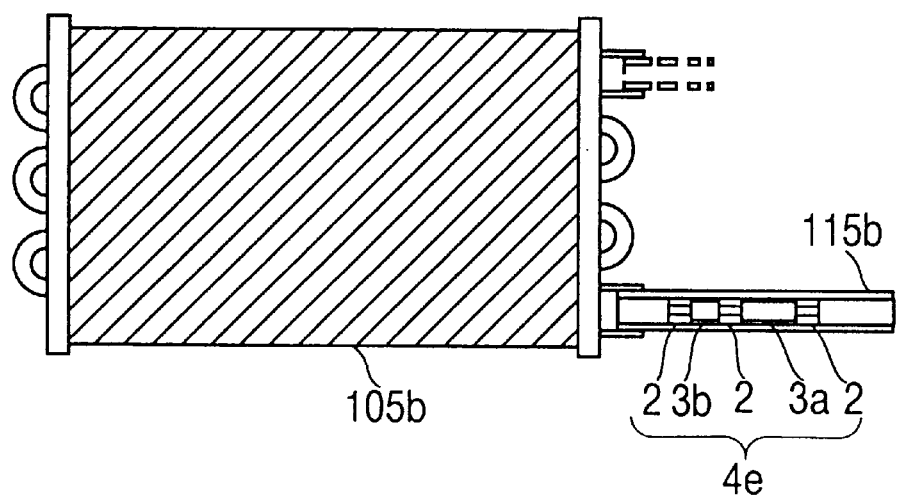
FIG. 17 is an essential magnified view of another indoor heat exchanger, gas side lead pipe, and silencer of the second embodiment.

If the gas refrigerant flowing into the indoor heat exchanger 105a in the operating indoor unit 109a is in a state having pressure pulsations, that is, if the temperature or pressure state fluctuates significantly when starting the operation of the compressor 101, when stopping the operation, or when changing the rotating speed, or if the refrigeration cycle shows an unstable behavior due to presence of height difference in the configuration of the outdoor unit 108 and indoor unit 109a, when pressure pulsations reach the indoor heat exchanger 105a, refrigerant radiation noise occurs in the indoor heat exchanger 105a due to the pulsations. Still more, the refrigerant flowing into the indoor heat exchanger 105b in the indoor unit 109b while in a stopped state is very small in flow rate, and a gas-liquid two-phase state of high ratio of gas refrigerant is formed. If the ratio of gas refrigerant and liquid refrigerant in this gas-liquid two-phase refrigerant fluctuates largely, being accompanied by pressure pulsations, that is, if the temperature or pressure state fluctuates significantly when starting the operation of the compressor 101, when stopping the operation, or when changing the rotating speed, or if the refrigeration cycle shows an unstable behavior due to presence of height difference in the configuration of the outdoor unit 108 and indoor unit 109a, refrigerant radiation noise occurs in the indoor heat exchanger 105a due to pulsations of the refrigerant, and also refrigerant flowing noise occurs due to uneven flow of the gas-liquid two-phase refrigerant. In particular, in the indoor unit 109b in a stopped state, since the indoor fan (not shown) is also stopped, the refrigerant sound generated in the indoor heat exchanger 105b becomes a dominant noise. The transmission attenuating effect of pressure pulsation and noise in the silencer 4e provided in the indoor unit 109b in a stopped state is described while referring to FIG. 17. FIG. 17 is an essential magnified view of the indoor heat exchanger 105b, gas side lead pipe 115b, and silencer 4e, and as shown in the diagram, the gas side lead pipe 115b is joined to the refrigerant flow-in part of the indoor heat exchanger 105b by brazing or welding, and the silencer 4e is included in the gas side lead pipe 115b. The silencer 4e is composed the same as is the silencer 4b and silencer 4d, and is formed of a honeycomb pipe 2 bundling a plurality of fine tubes 1, a hollow cylindrical tube 3a of an outside diameter that is smaller than the inside diameter of the gas side lead pipe 115b, a further honeycomb pipe 2, cylindrical tube 3b, and yet another honeycomb pipe 2, which are sequentially inserted into the gas side lead pipe 115b. The cylindrical tube 3a and cylindrical tube 3b are different in length, and by extending the gas side lead pipe 115b, the silencer 4e composed of the honeycomb pipes 2, cylindrical tube 3a and cylindrical tube 3b is fixed in the gas side lead pipe 115b.

Figure 18:
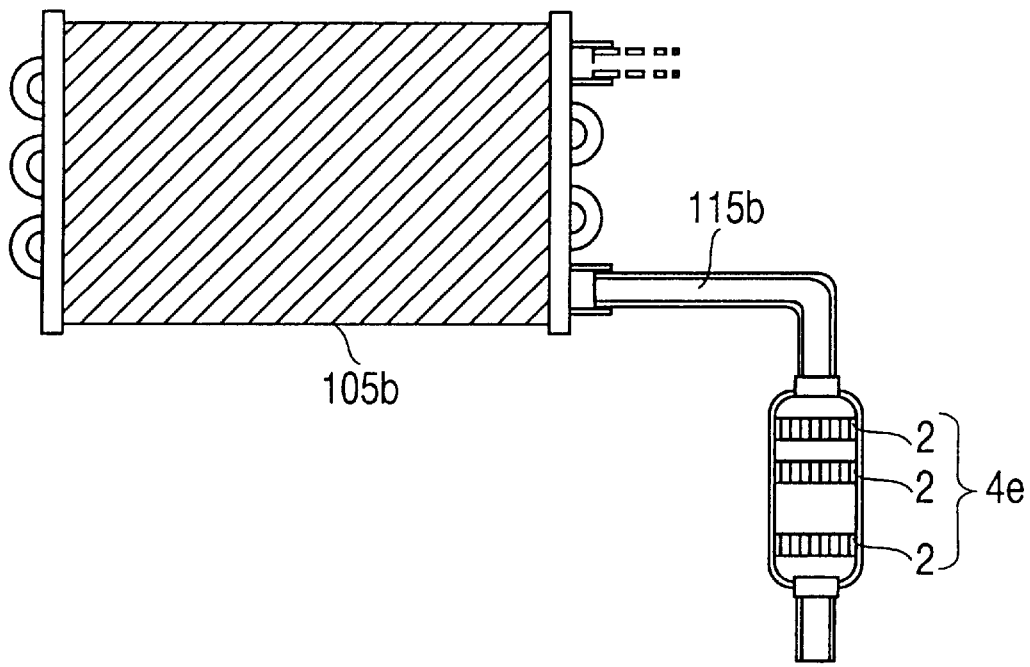
FIG. 18 is an essential magnified view of another construction of the another indoor heat exchanger, gas side lead pipe, and silencer of the second embodiment.
Figure 19:
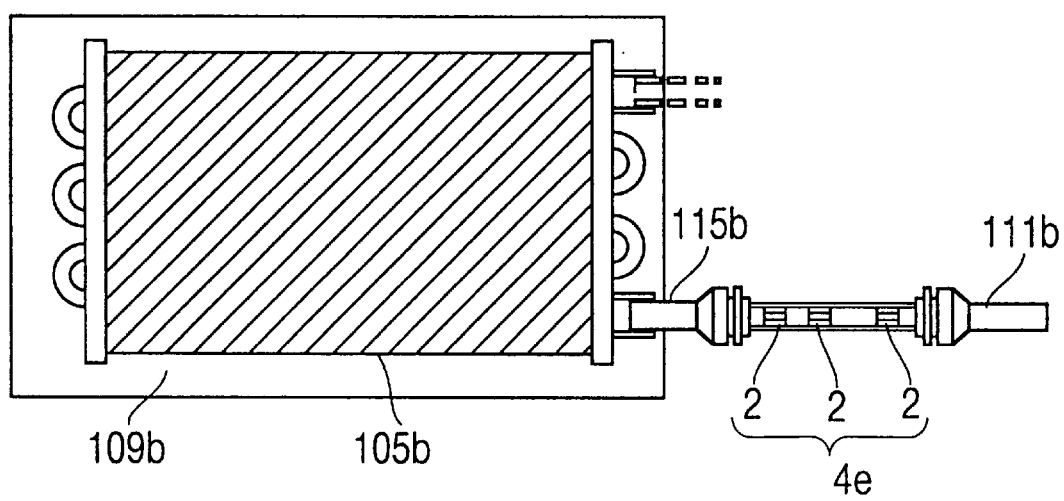
FIG. 19 is an essential magnified view of yet another construction of the another indoor heat exchanger, gas side lead pipe, and silencer of the second embodiment.

If unstable gas-liquid two-phase refrigerant fluctuating in the ratio of gas refrigerant and liquid refrigerant flows into the gas side lead pipe 115b, the refrigerant passes through the silencer 4e provided in the gas side lead pipe 115b. The gas-liquid two-phase refrigerant flowing into the silencer 4e first collides against the first honeycomb pipe 2 and receives resistance, and both the liquid refrigerant and the gas refrigerant are dispersed, and then flow into the fine tubes 1 forming the first honeycomb pipe 2. Since the plurality of the fine tubes 1 each have mutually different routes, the refrigerant flowing into each fine tube 1 continues to flow in each fine tube 1 without interfering with the refrigerant flowing in each other fine tube 1, so that the refrigerant is homogenized and straightened. The refrigerant passing through the fine tubes 1 flows out into the space formed by the cylindrical tube 3a. Since the opening sectional area if the cylindrical tube 3a is relatively wider than the opening sectional area of the honeycomb pipe 2, the refrigerant passing through the cylindrical tube 3a is expanded, and the pressure pulsations are attenuated. Further, as the refrigerant sequentially passes through the further honeycomb pipe 2, cylindrical tube 3b, and yet another honeycomb pipe 2, the homogenizing, straightening, and pressure pulsation decreasing effects are enhanced, and then it flows out from the silencer 4e. The refrigerant flowing out from the silencer 4e flows into the indoor heat exchanger 105b. At this time, since the gas-liquid two-phase refrigerant flowing into the indoor heat exchanger 105b is sufficiently homogenized in the gas phase and liquid phase, and is sufficiently attenuated in pressure pulsations, in the indoor heat exchanger 105b it is possible to reduce sufficiently the refrigerant flowing noise due to uneven flow of the gas-liquid two-phase refrigerant and refrigerant radiation noise due to pressure pulsations. Moreover frequency characteristics of pressure pulsations and frequency characteristics of noise vary depending on the rate of the liquid refrigerant and gas refrigerant in the gas-liquid two-phase refrigerant, but by changing the combination of the length of the cylindrical tube 3a and the length of the cylindrical tube 3b, it is possible to combine the frequency of high sound pressure level and the frequency of large attenuation, so that reduction of noise and attenuation of transmission of pressure pulsation can be achieved regardless of cycle state fluctuations. In the embodiment, the silencer 4e is fixed by extending the gas side lead pipe 115b, but it may be also fixed by crimping or belting at both ends of the silencer 4e, and the interval of the adjacent honeycomb pipes 2 is kept by using the cylindrical tubes 3a, 3b. But the interval may be also kept by belting or crimping the piping, or by using tubes of a shape other than cylindrical, or by using structure other than tubes. Further, instead of placing the silencer 4e in the gas side lead pipe 115b, the silencer 4e may be formed as a different part, and attached to the gas side lead pipe 115b by brazing, welding, making a flare connection or the like. Moreover, instead of being disposed in the gas side lead pipe 115b, the silencer 4e may be also placed between the gas side lead pipe 115b and gas side piping 111b. For example, as shown in FIG. 18, the silencer 4e may be made of a different part differing in diameter from that of the gas side lead pipe 115b, and brazed to the gas side lead pipe 115b, and the honeycomb pipes 2 are fixed and the interval kept by crimping. Or, as shown in FIG. 19, the silencer 4e may be made of a separate part and disposed outside of the indoor unit 109b, and may be placed between the gas side lead pipe 115b and gas side piping 111b by making a flare connection.

Figure 20:
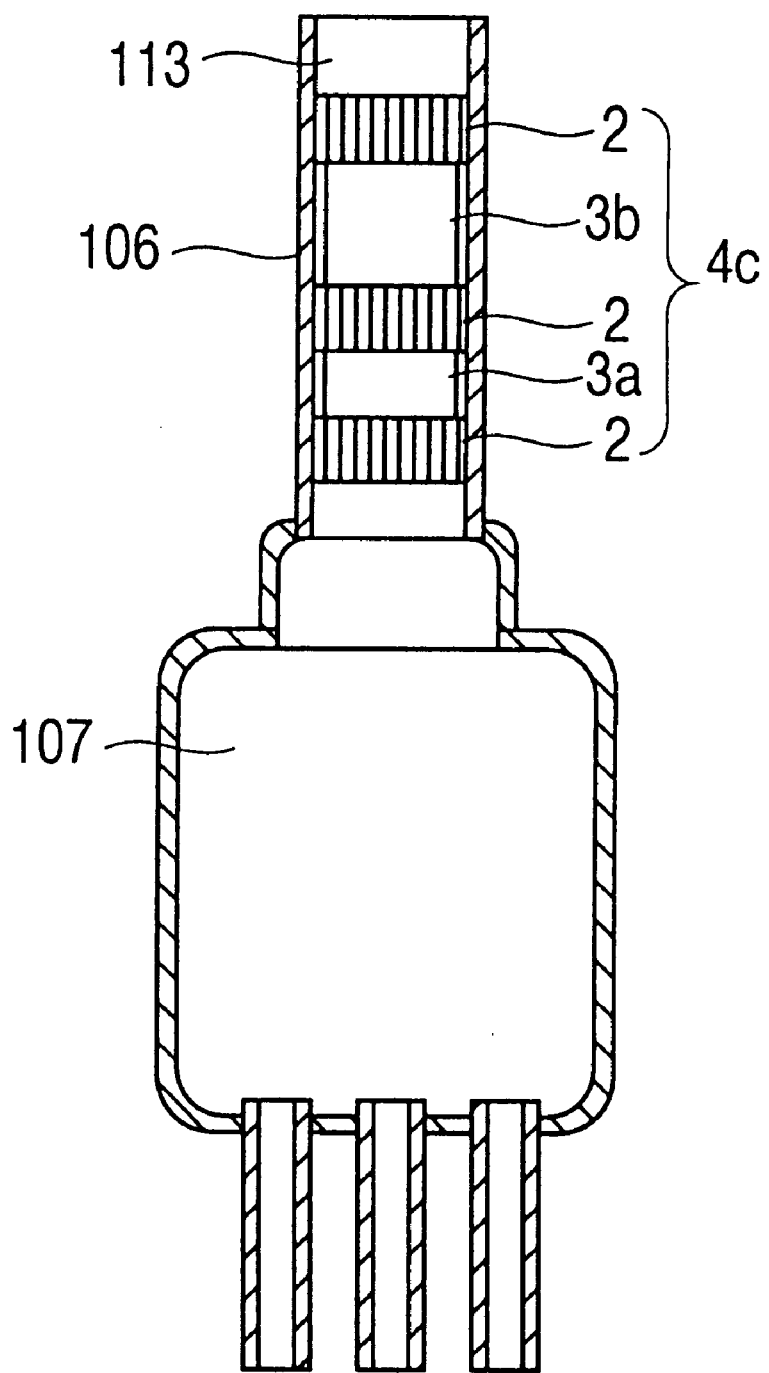
FIG. 20 is an essential magnified view of a distributor, convergent piping, and silencer of the second embodiment.

If the ratio of the gas refrigerant and liquid refrigerant of the gas-liquid two-phase refrigerant flowing into the distributor 107 fluctuates largely, that is, if the temperature or pressure state fluctuates largely when starting the operation of the compressor 101, stopping the operation, or changing the rotating speed, a large amount of pressure pulsation and noise will be generated. Silencer 4c will attenuate the transmission of this pressure pulsation and noise as explained by referring to FIG. 20. FIG. 20 is an essential magnified view of the distributor 107, convergent piping 113, and silencer 4c. As shown in the diagram the convergent piping 113 is joined to the convergent part of the distributor 107 by brazing or welding, and the silencer 4c is included in the convergent piping 113. The silencer 4c is composed the same as are the silencers 4b, 4d, 4e, and is formed of a honeycomb pipe 2 bundling a plurality of fine tubes 1, a hollow cylindrical tube 3a of an outside diameter that is smaller than the inside diameter of the convergent piping 113, a further honeycomb pipe 2, cylindrical tube 3b, and yet another honeycomb pipe 2, which are sequentially inserted into the convergent piping 113. The cylindrical tube 3a and cylindrical tube 3b are different in length, and by extending the convergent piping 113, the silencer 4c composed of the honeycomb pipes 2, cylindrical tube 3a and cylindrical tube 3b is fixed in the convergent piping 113.

Figure 21:
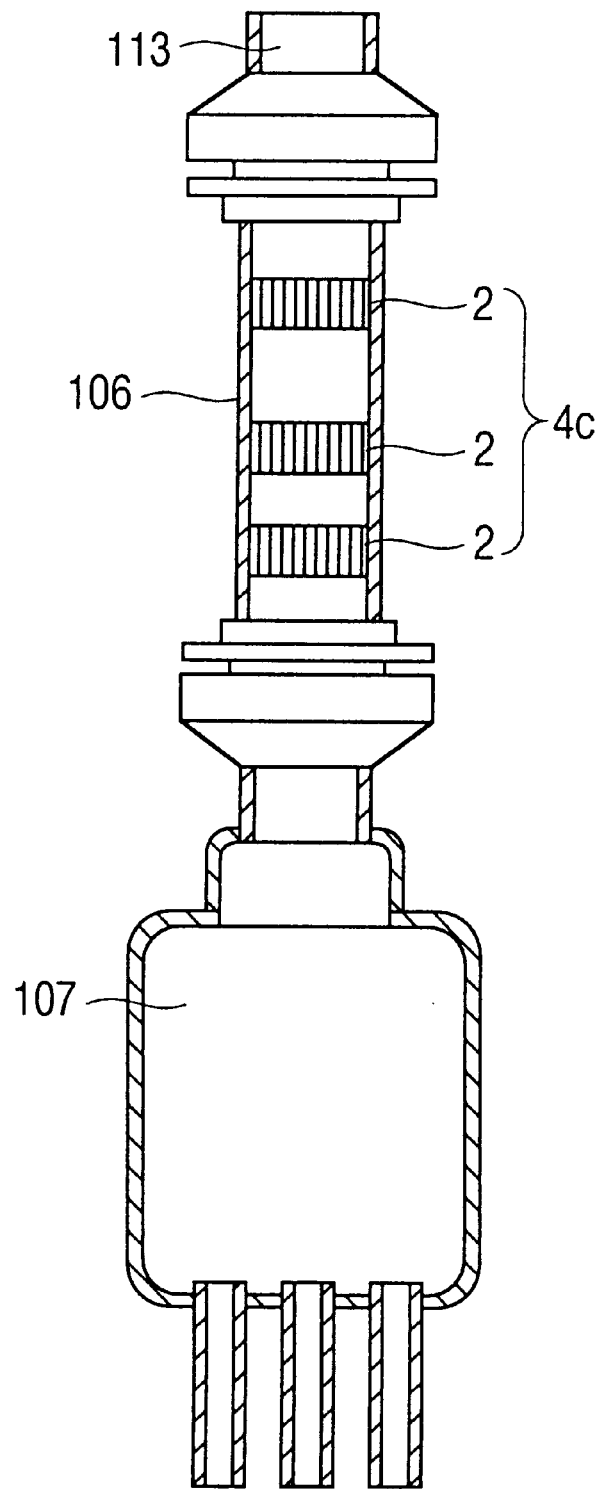
FIG. 21 is an essential magnified view of another construction of the distributor, convergent piping, and silencer of the second invention.
Figure 22:
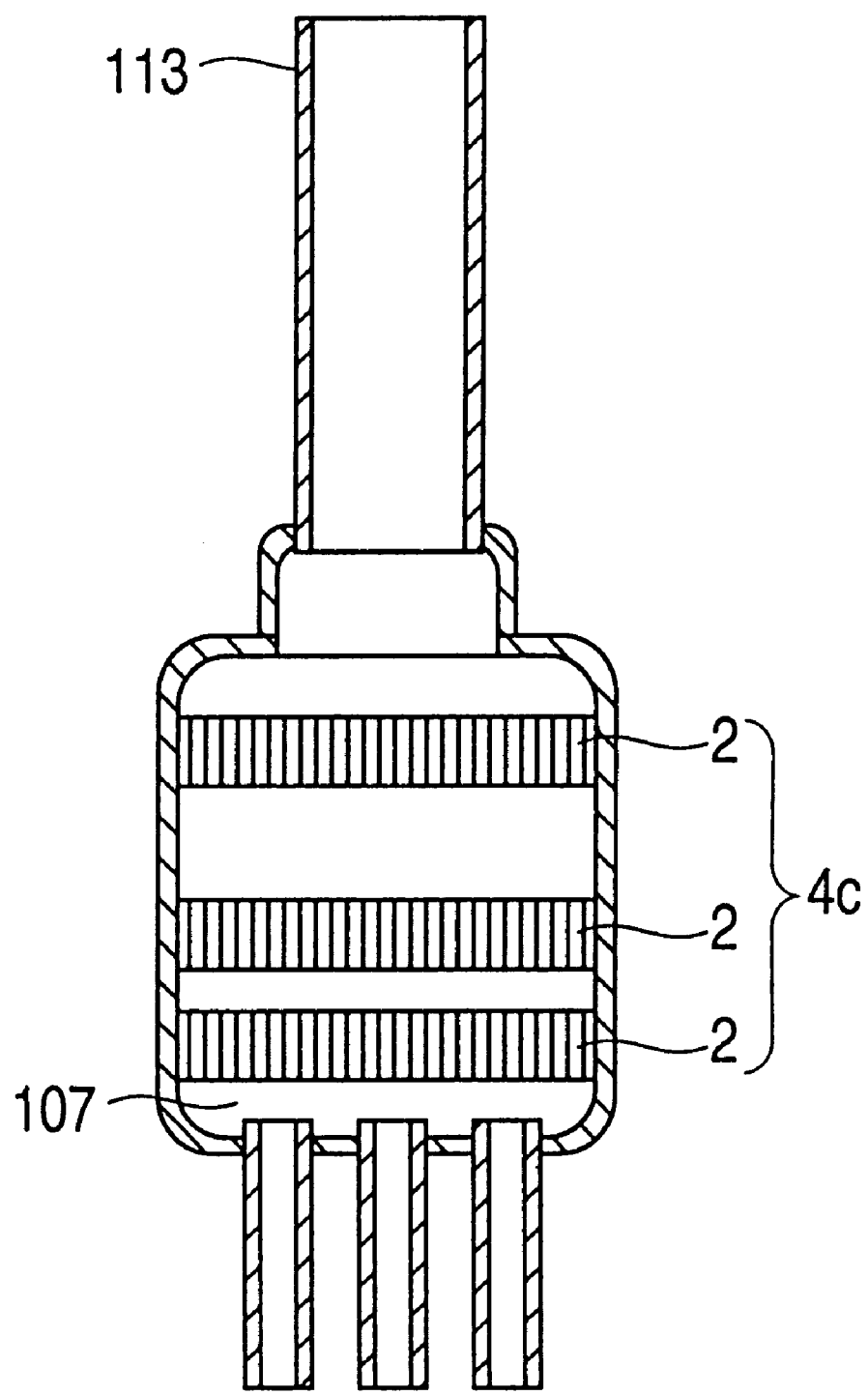
FIG. 22 is an essential magnified view of yet another construction of the distributor, convergent piping, and silencer of the second invention.
Figure 23:
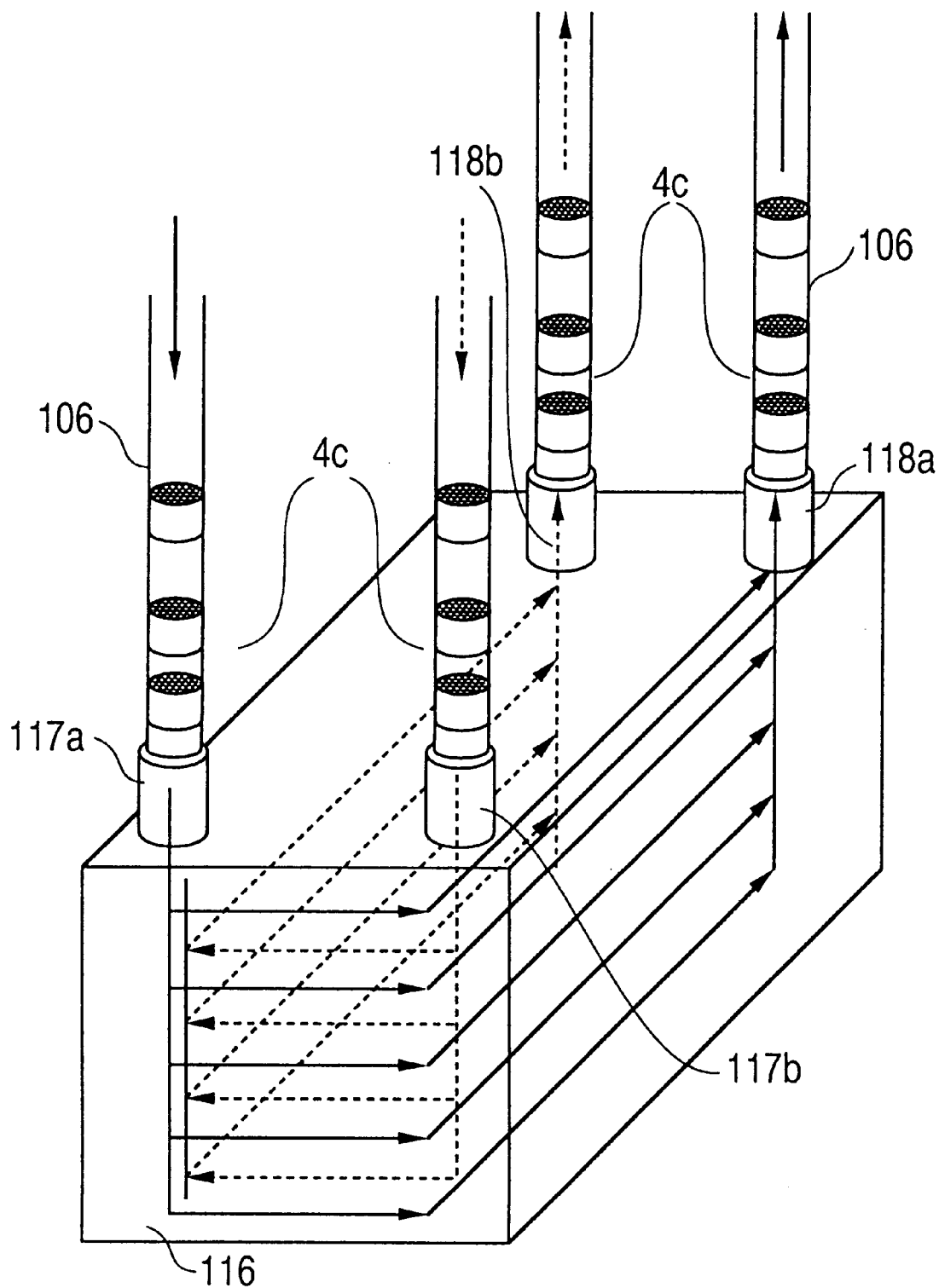
FIG. 23 is an essential magnified view of a further different construction of a heat exchanger and silencers.
Figure 24:
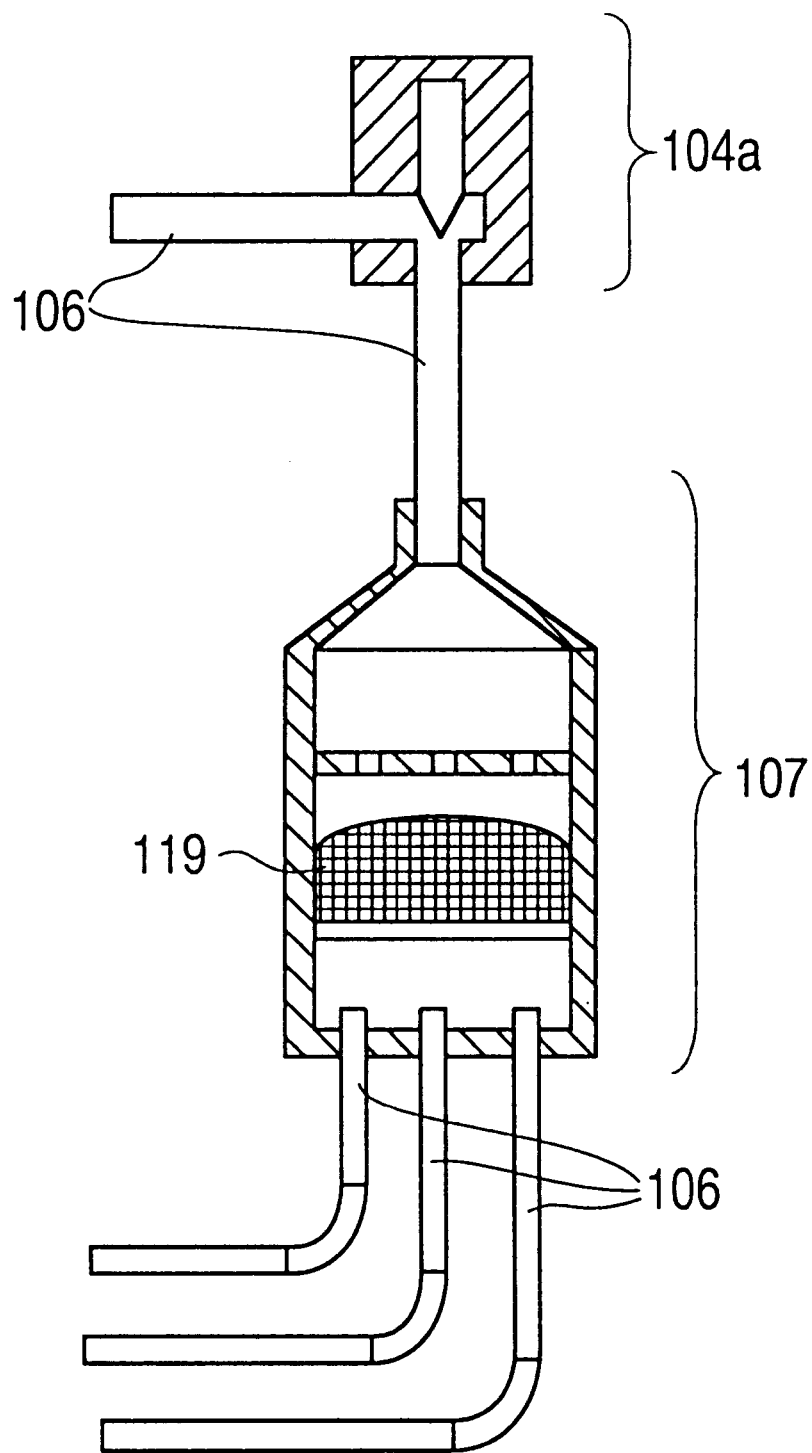
FIG. 24 is a structural diagram showing an example of a conventional silencer.
Figure 25:
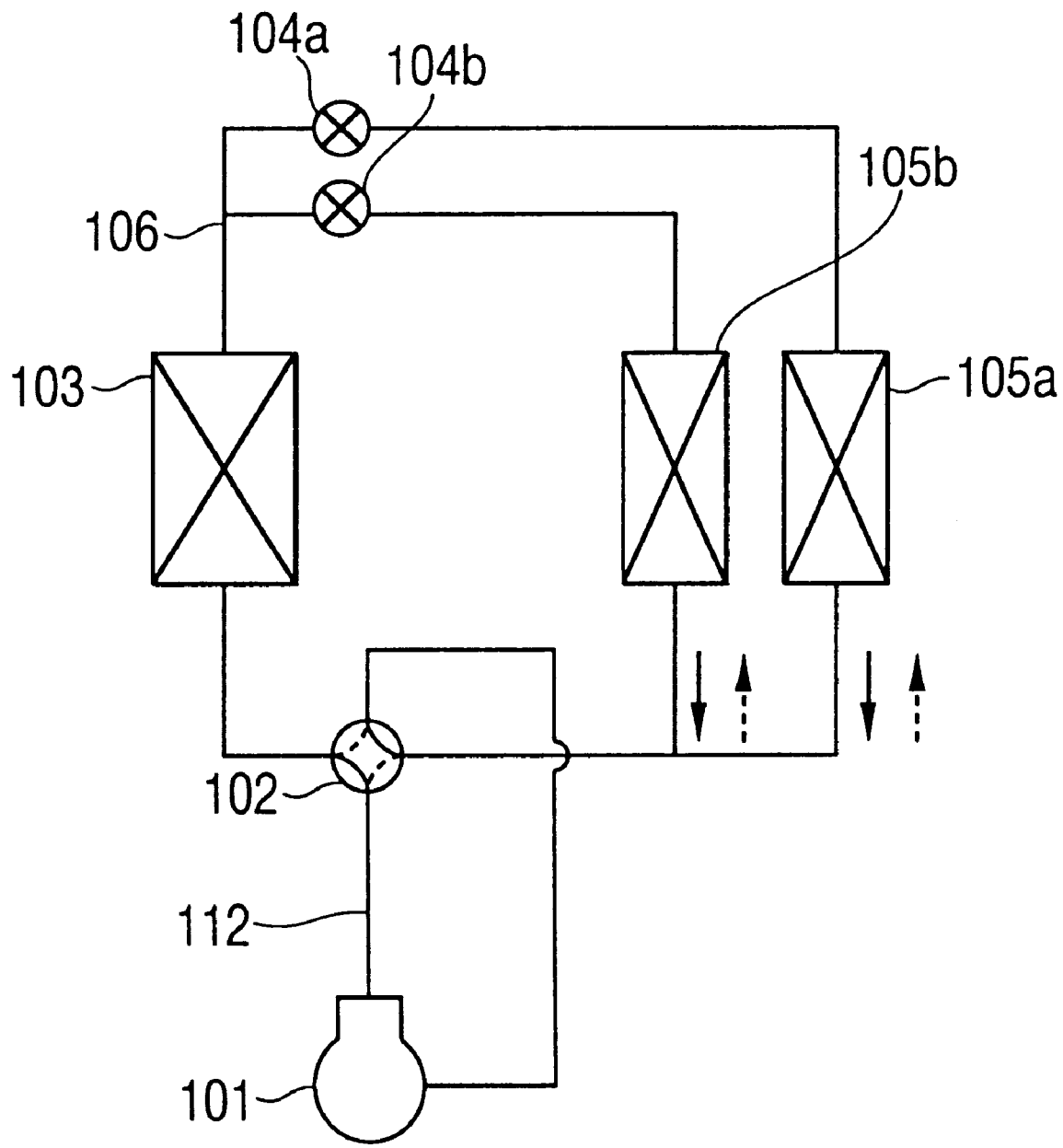
FIG. 25 is a refrigeration cycle diagram of a conventional air conditioner.

If an unstable gas-liquid two-phase refrigerant fluctuating in the ratio of gas refrigerant and liquid refrigerant flows into the convergent piping 113, the refrigerant passes through the silencer 4c provided in the convergent piping 113. The gas-liquid two-phase refrigerant flowing into the silencer 4c first collides against the first honeycomb pipe 2 and receives resistance, and both liquid refrigerant and gas refrigerant are dispersed, and then flow into the fine tubes 1 forming the first honeycomb pipe 2. Since the plurality of the fine tubes 1 each have mutually different routes, the refrigerant flowing into each fine tube 1 continues to flow in each fine tube 1 without interfering with the refrigerant flowing in each other fine tube 1, so that the refrigerant is homogenized and straightened. The refrigerant passing through the fine tubes 1 flows out into the space formed by the cylindrical tube 3a. Since the opening sectional area of the cylindrical tube 3a is relatively wider than the opening sectional area of the honeycomb pipe 2, the refrigerant passing through the cylindrical tube 3a is expanded, and the pressure pulsations are attenuated. Further, as the refrigerant sequentially passes through the further honeycomb pipe 2, cylindrical tube 3b, and yet another honeycomb pipe 2, the homogenizing, straightening, and pressure pulsation decreasing effects are enhanced, and then it flows out from the silencer 4c. The refrigerant flowing out from the silencer 4c flows into the distributor 107. At this time, since the gas-liquid two-phase refrigerant flowing into the distributor 107 is sufficiently homogenized, it is accurately divided in the distributor 107, and is uniformly distributed into plural routes in the outdoor heat exchanger 103, so that heat is exchanged efficiently. Moreover, the gas-liquid two-phase refrigerant flowing into the outdoor heat exchanger 103 is sufficiently homogenized in gas phase and liquid phase, and is sufficiently attenuated in pressure pulsations, and accordingly, in the outdoor heat exchanger 103 it is possible to reduce sufficiently the refrigerant flowing noise due to uneven flow of the gas-liquid two-phase refrigerant and refrigerant radiation noise due to pressure pulsations. Moreover, frequency characteristics of pressure pulsations and frequency characteristics of noise vary by depending on the rate of the liquid refrigerant and gas refrigerant in the gas-liquid two-phase refrigerant, but by changing the combination of the length of cylindrical tube 3a and length of the cylindrical tube 3b, it is possible to combine the frequency of high sound pressure level and frequency of large attenuation, so that reduction of noise and attenuation of transmission of pressure pulsation can be achieved regardless of cycle state fluctuations. In this embodiment, the silencer 4c is fixed by extending the convergent piping 113, but it may be also fixed by crimping or belting at both ends of the silencer 4c, and the interval between the adjacent honeycomb pipes 2 is kept by using the cylindrical tubes 3a, 3b. But the interval may be also kept by belting or crimping the piping, or by using tubes of a shape other than cylindrical, or by using structure other than tubes. Further, instead of placing the silencer 4c in the convergent piping 113, the silencer 4c may be formed as a different part, and attached to the convergent piping 113 by brazing, welding, making a flare connection or the like. Moreover, instead of being disposed in the convergent piping 113, the silencer 4c may be inserted and fixed in the distributor 107 to compose the distributor 107 and silencer 4c integrally. For example, as shown in FIG. 21, the silencer 4c may be made of a different part differing in diameter from that of the convergent piping 113, and connected to the convergent piping by making a flare connection, and the honeycomb pipes 2 fixed and the interval kept by crimping. Or, as shown in FIG. 22, the silencer 4c can be inserted into the distributor 107, and fixed thereto, and the intervals between adjacent honeycomb pipes kept by crimping, whereby the distributor 107 is formed integrally with the silencer 4c. In this embodiment, meanwhile, the outdoor heat exchanger 103 is an air-cooled multi-pass fin and tube heat exchanger, and the silencer 4c is provided in the distributor 107 connected thereto. But the applicable heat exchanger is not limited to the fin and tube type alone, and the same effects can be obtained by installing the silencer 4c in the flow-in part of a plate type heat exchanger using water or refrigerant as a heat source, or a double tube type heat exchanger. FIG. 23 is a structural diagram of installing each silencer 4c in the fluid flow-in part of a plate type heat exchanger, and the plate type heat exchanger 116 includes plural laminated plates for forming the fluid passage, and exchanges heat between fluids by passing two kinds of fluids mutually in plural passages. The flow of the first fluid flowing in the plate type heat exchanger is indicated by the solid line, and the flow of the second fluid to exchange heat with the first fluid is indicted by the broken line. A silencer 4c is provided in the heat exchanger 116 individually at a fluid flow-in part 117a for guiding the first fluid into the plate type heat exchanger 116, a fluid flow-in part 117b for guiding the second fluid into the plate type heat exchanger 116, a fluid flow-out part 118a for sending out the first fluid from the plate type heat exchanger 116, and a fluid flow-out part 118b for sending out the second fluid from the plate type heat exchanger 116. The first fluid and second fluid, when passing through the fluid flow-in parts 117a, 117b are suppressed of pulsation, and are homogenized and straightened, and further flow into the plate type heat exchanger 116 to be divided into each passage, and by reduction of passing noise by attenuation of pulsation, and uniform distribution, the heat exchange efficiency is enhanced.

In this embodiment, the heat pump type refrigeration cycle is explained, but the same silencing effects are obtained in the exclusive cooling cycle.

The honeycomb pipe used as the refrigerant homogenizing means is composed by bundling plural fine tubes, but as far as plural communication holes are provided, communication holes may be provided in a cylinder.

The plural fine tubes are same in diameter, but fine tubes of different diameters may be also combined.

Instead of arranging honeycomb pipes having the same sized opening area arranged adjacently, honeycomb pipes having different sized opening areas may be arranged adjacently.

The structure of the honeycomb pipe is cylindrical, but it may also be formed in a polygonal shape.

A cylindrical tube is used for keeping the clearance between adjacent honeycomb pipes, but a polygonal tube may be also used.

Honeycomb pipes are used as homogenizing means of refrigerant, but porous metal or porous ceramic may be also used.

The number of honeycomb pipes for forming the silencer is three and the number of cylindrical tubes is two, but each number may be less than three or less than two, or three or more or two or more, respectively.

Each cylindrical tube differs in length, but tubes of same length may also be used.

The number of indoor heat exchangers is two, but it may be one or three or more. As an example of a cooling operation, the indoor unit 109a is put in a cooling operation, but the same effects are obtained if the indoor unit 109b is put in the cooling operation, or both indoor units 109a and 109b are put in a cooling operation.

As an example of a heating operation, the indoor unit 109b is kept in stopped state, but the indoor unit 109a may be kept in stopped state, or both indoor units 109a and 109b may be put in a heating operation. A plurality of silencers are provided in the refrigeration cycle, but each may be provided individually, or the combination of silencers may be changed.

Noise and pulsations decreasing effects may also be obtained by disposing the silencers of the invention at other positions generating the refrigerant noise in the refrigeration cycle than those shown in the embodiments.

According to the invention, since the silencer is formed by inserting and fixing a silencer member into the refrigerant piping of a specific sectional area, a silencer capable of omitting an extra space for installing the silencer is presented.

The increase in the number of parts is kept to a minimum, and the construction is simple, so that a silencer easy to assemble and operate is presented.

If the refrigerant flows in an irregular gas-liquid two-phase state or if pulsations are large, a silencer effective for attenuating transmission of pressure pulsations effectively and reducing the refrigerant flowing noise is presented.

The invention presents a silencer capable of reducing the refrigerant flowing noise and attenuating transmission of pressure pulsations regardless of cycle state fluctuations.

The invention also presents an air conditioner capable of homogenizing the refrigeration in the processor of passing the silencer if the refrigerant flowing into the pressure reducing means is in gas-liquid two-phase state. The air conditioner is also capable of attenuating transmission of throttle passing noise during decompression, and during pressure pulsation due to decompression by the silencer.

The invention also presents an air conditioner capable of reducing the pulsations and attenuating transmission of pulsations after the silencer, in the process of passing the refrigerant through the silencer provided in the piping. The silencer is connected to the discharge unit of the compressor, and will reduce the pulsations if the pressure pulsations of the refrigerant discharged from the compressor are large.

The invention also presents an air conditioner capable of reducing pulsations in the process of passing the refrigerant through the silencer provided in the refrigerant flow-in part of the condenser, and also capable of attenuating the refrigerant radiation noise in the condenser coil unit caused by pressure pulsation of the refrigerant when the gas refrigerant having pressure pulsations flows into the condenser.

The invention also presents an air conditioner capable of straightening and homogenizing the gas refrigerant and liquid refrigerant in the process of passing the refrigerant through the silencer provided in the flow-in part of the evaporator, and also capable of attenuating the refrigerant radiation noise in the evaporator coil unit caused by irregular flow of the gas-liquid two-phase refrigerant when the refrigerant flows into the evaporator in an irregular gas-liquid two-phase state.

The invention further presents an air conditioner capable of straightening and homogenizing the gas refrigerant and liquid refrigerant in the process of passing the refrigerant through the silencer provided in the refrigerant flow-in part of the distributor, and also capable of attenuating the irregular collision sound of liquid refrigerant and gas refrigerant in the distributor, as well as dividing the flow of refrigerant appropriately into the condenser or evaporator when the refrigerant flows into the distributor and in an irregular gas-liquid two-phase state.

What is claimed is:

1. A refrigeration system, comprising:
   refrigerant piping; and
   a silencer in said refrigerant piping, wherein said silencer includes axially spaced bundles of tubes.

2. The refrigeration system according to claim 1, wherein said axially spaced bundles of tubes define axially spaced honeycomb pipes.

3. The refrigeration system according to claim 2, wherein said refrigerant piping includes a uniform sectional area.

4. The refrigeration system according to claim 1, and further comprising a compressor, a condenser, a pressure reducer and an evaporator, wherein said refrigerant piping interconnects said compressor, condenser, pressure reducer and evaporator.

5. The refrigeration system according to claim 1, wherein the axial spacing between adjacent ones of said bundles of tubes is different for each set of said adjacent ones of said bundles of tubes.

6. The refrigeration system according to claim 4, wherein said silencer is disposed at an entrance or exit of said pressure reducer.

7. The refrigeration system according to claim 4, wherein said compressor includes a discharge unit, and said silencer is connected to said discharge unit.

8. The refrigeration system according to claim 4, wherein said silencer is disposed at an entrance or exit of said condenser.

9. The refrigeration system according to claim 4, wherein said silencer is disposed at an entrance or exit of said evaporator.

10. The refrigeration system according to claim 4, and further comprising a distributor to distribute refrigerant into the condenser or evaporator, wherein said silencer is disposed at an entrance of said distributor.

11. The refrigeration system according to claim 1, wherein said bundles of tubes are fixed within said refrigerant piping.

12. A refrigeration system, comprising:
   refrigerant piping; and
   a silencer in said refrigerant piping, wherein said silencer includes axially spaced cylinders each having holes extending therethrough.

13. The refrigeration system according to claim 12, wherein said refrigerant piping includes a uniform sectional area.

14. The refrigeration system according to claim 12, and further comprising a compressor, a condenser, a pressure reducer and an evaporator, wherein said refrigerant piping interconnects said compressor, condenser, pressure reducer and evaporator.

15. The refrigeration system according to claim 12, wherein the axial spacing between adjacent ones of said cylinders is different for each set of said adjacent ones of said cylinders.

16. The refrigeration system according to claim 14, wherein said silencer is disposed at an entrance or exit of said pressure reducer.

17. The refrigeration system according to claim 14, wherein said compressor includes a discharge unit, and said silencer is connected to said discharge unit.

18. The refrigeration system according to claim 14, wherein said spencer is disposed at an entrance or exit of said condenser.

19. The refrigeration system according to claim 14, wherein said silencer is disposed at an entrance or exit of said evaporator.

20. The refrigeration system according to claim 14, and further comprising a distributor to distribute refrigerant into the condenser or evaporator, wherein said silencer is disposed at an entrance of said distributor.

21. The refrigeration system according to claim 12, wherein said cylinders are fixed within said refrigerant piping.

22. A refrigeration system, comprising:

refrigerant piping; and a silencer in said refrigerant piping, wherein said silencer includes axially spaced porous bodies.

23. The refrigeration system according to claim 22, wherein said porous bodies include a material selected from the group consisting of metal and ceramic.

24. The refrigeration system according to claim 23, wherein said refrigerant piping includes a uniform sectional area.

25. The refrigeration system according to claim 23, and further comprising a compressor, a condenser, a pressure reducer and an evaporator, wherein said refrigerant piping interconnects said compressor, condenser, pressure reducer and evaporator.

26. The refrigeration system according to claim 23, wherein the axial spacing between adjacent ones of said porous bodies is different for each set of adjacent ones of said porous bodies.

27. The refrigeration system according to claim 25, wherein said silencer is disposed at an entrance or exit of said pressure reducer.

28. The refrigeration system according to claim 25, wherein said compressor includes a discharge unit, and said silencer is connected to said discharge unit.

29. The refrigeration system according to claim 25, wherein said silencer is disposed at an entrance or exit of said condenser.

30. The refrigeration system according to claim 25, wherein said silencer is disposed at an entrance or exit of said evaporator.

31. The refrigeration system according to claim 25, and further comprising a distributor to distribute refrigerant into the condenser or evaporator, wherein said silencer is disposed at an entrance of said distributor.

32. The refrigeration system according to claim 23, wherein said porous bodies are fixed within said refrigerant piping.

33. A silencer for use in a refrigeration system including a compressor, a condenser, a pressure reducer, an evaporator, and refrigerant piping interconnecting the compressor, condenser, pressure reducer and evaporator, the silencer comprising:

axially spaced bundles of tubes.

34. A silencer for use in a refrigeration system including a compressor, a condenser, a pressure reducer, an evaporator, and refrigerant piping interconnecting the compressor, condenser, pressure reducer and evaporator, the silencer comprising:

axially spaced cylinders each having holes extending therethrough.

35. A silencer for use in a refrigeration system including a compressor, a condenser, a pressure reducer, an evaporator, and refrigerant piping interconnecting the compressor, condenser, pressure reducer and evaporator, the silencer comprising:

axially spaced porous bodies.

36. The silencer according to claim 35, wherein said porous bodies include a material selected from the group consisting of metal and ceramic.

* * * * *